(12) United States Patent
Himeno et al.

(10) Patent No.: US 8,315,012 B2
(45) Date of Patent: Nov. 20, 2012

(54) SPINDLE MOTOR INCLUDING COMMUNICATING CHANNEL, AND DISK DRIVE APPARATUS

(75) Inventors: Toshikazu Himeno, Kyoto (JP); Shozo Tagata, Kyoto (JP); Shinya Yano, Kyoto (JP); Wataru Yamauchi, Kyoto (JP); Akihiro Yudate, Kyoto (JP)

(73) Assignee: Nidec Corporation, Kyoto (JP)

( * ) Notice: Subject to any disclaimer, the term of this patent is extended or adjusted under 35 U.S.C. 154(b) by 115 days.

(21) Appl. No.: 13/072,968

(22) Filed: Mar. 28, 2011

(65) Prior Publication Data
US 2011/0235210 A1 Sep. 29, 2011

(30) Foreign Application Priority Data
Mar. 29, 2010 (JP) ................................. 2010-075596

(51) Int. Cl.
*G11B 17/02* (2006.01)
*F16C 32/06* (2006.01)
*F16C 17/00* (2006.01)
(52) U.S. Cl. ..................................... 360/99.08; 384/114
(58) Field of Classification Search ............... 360/99.08; 384/114, 119
See application file for complete search history.

(56) References Cited

U.S. PATENT DOCUMENTS

| 7,059,772 | B2 * | 6/2006 | Oku et al. ....................... 384/119 |
| 7,121,725 | B2 * | 10/2006 | Aiello et al. .................... 384/107 |
| 7,210,850 | B2 * | 5/2007 | Kusaka et ..................... 384/107 |
| 7,290,933 | B2 * | 11/2007 | Braun et al. ................... 384/107 |
| 7,435,001 | B2 * | 10/2008 | Kainoh et al. ................. 384/100 |
| 7,473,034 | B2 * | 1/2009 | Saito et al. ..................... 384/107 |
| 7,524,113 | B2 * | 4/2009 | Haga et al. ..................... 384/123 |
| 8,064,166 | B2 * | 11/2011 | Kainoh et al. ................. 360/224 |
| 2002/0025090 | A1 * | 2/2002 | Sakatani et al. ............... 384/107 |
| 2004/0101217 | A1 * | 5/2004 | Kinoshita et al. ............. 384/100 |
| 2007/0133911 | A1 | 6/2007 | Nishimoto et al. |
| 2009/0080819 | A1 * | 3/2009 | Rehm ........................... 384/241 |
| 2009/0231754 | A1 | 9/2009 | Sekii et al. |
| 2010/0226601 | A1 * | 9/2010 | Inazuka et al. ................ 384/107 |

FOREIGN PATENT DOCUMENTS

| JP | 8-277835 A | 10/1996 |
| JP | 10-259820 A | 9/1998 |
| JP | 11-264409 A | 9/1999 |
| JP | 2001-214929 A | 8/2001 |
| JP | 2004-132455 A | 4/2004 |
| JP | 2005-48890 A | 2/2005 |
| JP | 2009-8200 A | 1/2009 |

* cited by examiner

*Primary Examiner* — Angel A. Castro
(74) *Attorney, Agent, or Firm* — Keating & Bennett, LLP

(57) ABSTRACT

A spindle motor for use in a disk drive apparatus includes stationary and rotating portions. The stationary portion includes a shaft including a thrust plate. A sleeve portion includes an axial end surface arranged opposite the thrust plate. A first seal member is arranged opposite the thrust plate on an opposite side with respect to the sleeve portion. The thrust plate preferably includes a plate communicating hole arranged to connect first and second thrust gaps defined, respectively, between the thrust plate and the sleeve portion and between the thrust plate and the first seal member. The sleeve portion preferably includes a sleeve communicating hole arranged to connect the first thrust gap with an opposite axial side thereof. A lubricant is arranged to fill a communicating channel extending from a first to a second capillary seal portion through the plate communicating hole and the sleeve communicating hole.

8 Claims, 22 Drawing Sheets

SPINDLE MOTOR INCLUDING COMMUNICATING CHANNEL, AND DISK DRIVE APPARATUS

BACKGROUND OF THE INVENTION

1. Field of the Invention

The present invention relates to an electric spindle motor.

2. Description of the Related Art

Motors including fluid dynamic pressure bearing mechanisms have often been used as motors for use in disk drive apparatuses. An example of such a motor is disclosed in JP-A 2001-214929 which includes a shaft, a flange, a sleeve, and a sleeve cap. The shaft is fixed to a base plate. The flange is fixed to the shaft. The sleeve cap is fixed to a bottom end of the sleeve. The shaft is arranged radially inward of the sleeve and the sleeve cap. The flange is arranged between a lower portion of the sleeve and the sleeve cap. Both an upper portion and a lower portion of the shaft include radial dynamic pressure grooves defined therein. Both an upper surface and a lower surface of the flange include thrust dynamic pressure grooves defined therein. A lubricating oil is arranged in a gap defined between a combination of the shaft and the flange and a combination of the sleeve and the sleeve cap. An upper surface of the lubricating oil is arranged between an upper portion of an outer circumferential surface of the shaft and an upper portion of an inner circumferential surface of the sleeve. A lower surface of the lubricating oil is arranged between a lower portion of the outer circumferential surface of the shaft and an inner circumferential surface of the sleeve cap. When the motor is driven, dynamic pressures generated by the radial dynamic pressure grooves and the thrust dynamic pressure grooves act to support the sleeve and the sleeve cap such that the sleeve and the sleeve cap are rotatable about the shaft.

A conventional fluid dynamic bearing apparatus used in a spindle motor disclosed in JP-A 2007-162759 includes a shaft body and a tubular sleeve body inside which the shaft body is inserted. The shaft body is fixed to a base plate of the motor. The sleeve body is fixed to a rotor of the motor. The shaft body includes a first thrust flange and a second thrust flange. The first thrust flange is annular in shape and arranged above the sleeve body. The second thrust flange is annular in shape and arranged below the sleeve body. The first thrust flange is integrally formed with the shaft body and the second thrust flange is fixed to the shaft body through welding or the like. In the fluid dynamic bearing apparatus, a radial bearing portion is defined between the shaft body and the sleeve body. A thrust bearing portion is defined between the sleeve body and each of the two thrust flanges. The sleeve body and the rotor are thereby supported to be rotatable relative to the shaft. In addition, the sleeve body includes a communicating hole arranged to connect two thrust gaps with each other. Surfaces of a lubricating oil are arranged in the vicinity of both an upper end opening and a lower end opening of the communicating hole.

However, the motor disclosed in JP-A 2001-214929 has a problem in that a difference in pressure may occur between the upper surface and the lower surface of the lubricating oil due to errors in processing the dynamic pressure grooves, or errors in assembling parts of the motor. The difference in pressure may lead to leakage of the lubricating oil through one of the surfaces of the lubricating oil. Also, the spindle motor disclosed in JP-A 2007-162759 has a problem in that, when the second thrust flange is fixed to the shaft body, it is difficult to define a minute gap between the second thrust flange and the sleeve body with excellent precision, and that a high-level technique is required when fixing the second thrust flange to the shaft body to ensure sufficient performance of the thrust bearing portion.

SUMMARY OF THE INVENTION

A spindle motor for use in a disk drive apparatus according to a preferred embodiment of the present invention includes a stationary portion including a stator, and a rotating portion including a rotor magnet. The rotating portion is arranged to be rotatably supported by the stationary portion. The stationary portion preferably includes a base portion and a shaft including a thrust plate and fixed to the base portion. The rotating portion preferably includes a sleeve portion and a first seal member. The sleeve preferably portion includes an axial end surface arranged opposite the thrust plate. The first seal member is arranged opposite the thrust plate on an opposite side of the thrust plate with respect to the sleeve portion. A radial gap defined between the shaft and the sleeve portion includes a radial bearing portion arranged to generate a fluid dynamic pressure defined therein. A first thrust gap defined between the thrust plate and the sleeve portion includes a first thrust bearing portion arranged to generate a fluid dynamic pressure defined therein. A second thrust gap defined between the thrust plate and the first seal member includes a second thrust bearing portion arranged to generate a fluid dynamic pressure defined therein. A first gap defined between the first seal member and the shaft includes a first capillary seal portion defined therein. A second gap defined between the shaft and the rotating portion on an opposite axial side of the sleeve portion with respect to the thrust plate includes a second capillary seal portion defined therein. The thrust plate preferably includes a plate communicating hole arranged to connect the first and second thrust gaps with each other. The sleeve portion preferably includes a sleeve communicating hole arranged to connect the first thrust gap with the opposite axial side of the sleeve portion with respect to the thrust plate. An end opening of the plate communicating hole and an end opening of the sleeve communicating hole are preferably arranged either radially outward or radially inward of the first thrust bearing portion in the first thrust gap. An opposite end opening of the plate communicating hole is arranged radially inward of the second thrust bearing portion in the second thrust gap. A lubricant is continuously arranged in a channel extending from the first capillary seal portion to the second capillary seal portion through the second thrust gap, a gap defined radially outside the thrust plate, the first thrust gap, and the radial gap. The lubricant is arranged to fill a communicating channel extending from the first capillary seal portion to the second capillary seal portion through the plate communicating hole and the sleeve communicating hole.

According to a preferred embodiment of the present invention, the first and second capillary seal portions are preferably joined to each other through the sleeve communicating hole and the plate communicating hole in a spindle motor having a stationary shaft. Because the lubricant is able to flow through the sleeve communicating hole and the plate communicating hole, a difference in pressure does not occur between the upper and lower capillary seal portions, or only a slight difference in pressure occurs between the upper and lower capillary seal portions such that the function of a bearing may not be impaired.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Herein, an upper side and a lower side in a direction parallel or substantially parallel to a central axis of a motor will be referred to simply as an upper side and a lower side, respectively. Note that a vertical direction as described herein is not meant to indicate relative positions or directions of different members of a device with respect to gravity when those members are actually arranged in the device.

Figure 1:
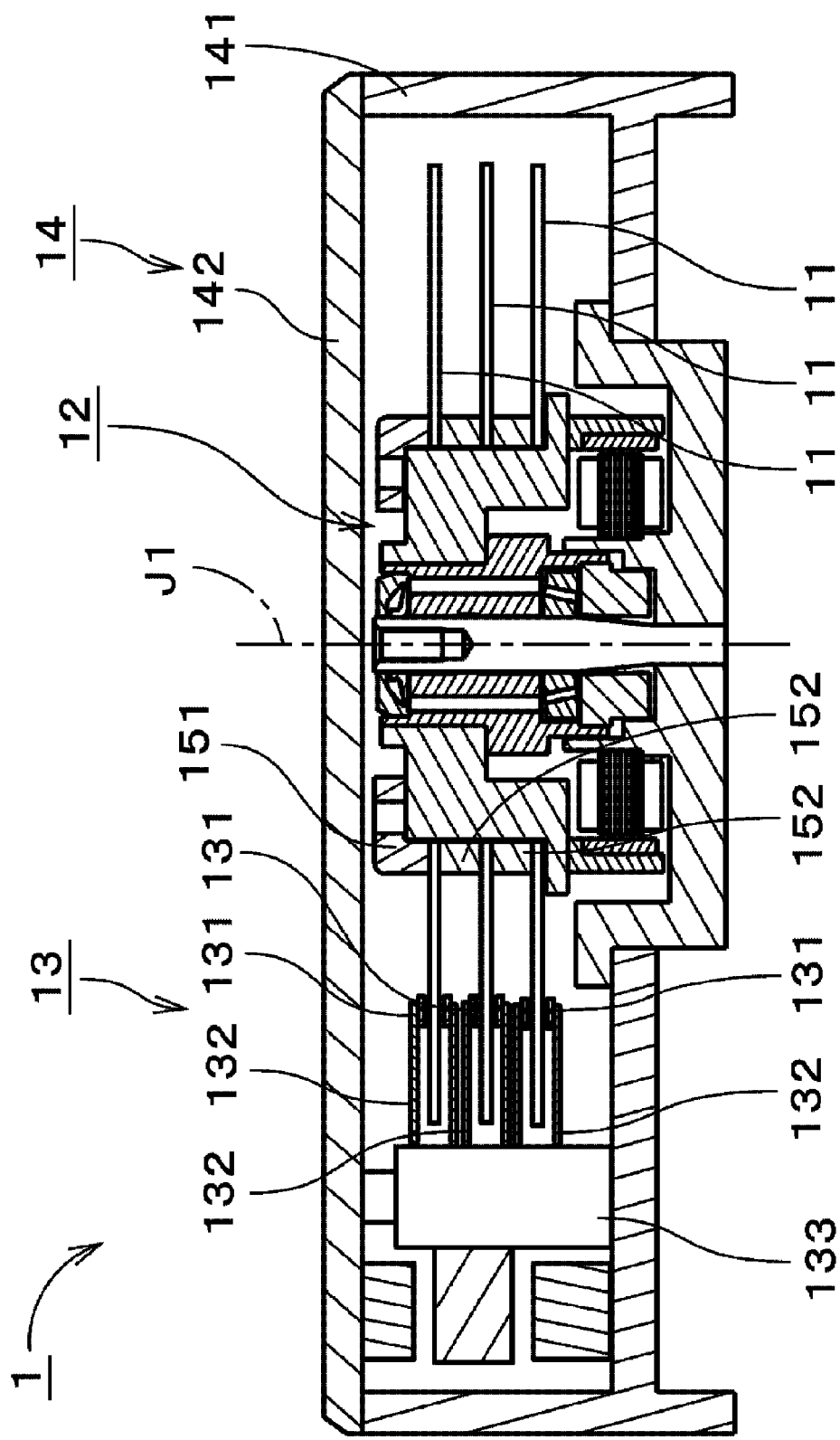
FIG. 1 is a diagram illustrating a disk drive apparatus according to a first preferred embodiment of the present invention.

FIG. 1 is a section view of a disk drive apparatus 1 including a spindle motor (hereinafter referred to simply as a "motor") 12 according to a first preferred embodiment of the present invention. The disk drive apparatus 1 is a so-called hard disk drive apparatus. The disk drive apparatus 1 preferably includes three disks 11, the motor 12, an access portion 13, and a housing 14, for example. The motor 12 is arranged to rotate while holding the disks 11, on which information is recorded. The access portion 13 is arranged to read and/or write information from or to any of the disks 11.

The housing 14 preferably includes a first housing member 141 and a second housing member 142. The first housing member 141 is arranged in the shape of a box without a lid and the second housing member 142 is arranged in the shape of a flat plate. The disks 11, the motor 12, and the access portion 13 are arranged inside the first housing member 141. The second housing member 142 is joined to the first housing member 141 to define the housing 14 of the disk drive apparatus 1. An interior space of the disk drive apparatus 1 is arranged to be a clean space preferably with no or an extremely small amount of dirt, dust, etc.

The three disks 11 are fixed to a rotor hub of the motor 12 such that the disks 11 are preferably equally spaced from one another in a direction parallel or substantially parallel to a central axis J1 through a clamper 151 and spacers 152. The access portion 13 preferably includes six heads 131, six arms 132, and a head actuator mechanism 133. Each of the heads 131 is arranged in close proximity to one of the disks 11 to read and/or write information from or to the disk 11. Each of the arms 132 is arranged to support a separate one of the heads 131. The head actuator mechanism 133 is arranged to move each of the arms 132 to move an associated one of the heads 131 relative to the corresponding disk 11. The head 131 is thus arranged to access a desired location of the rotating disk 11 while being kept in close proximity to the disk 11.

Figure 2:
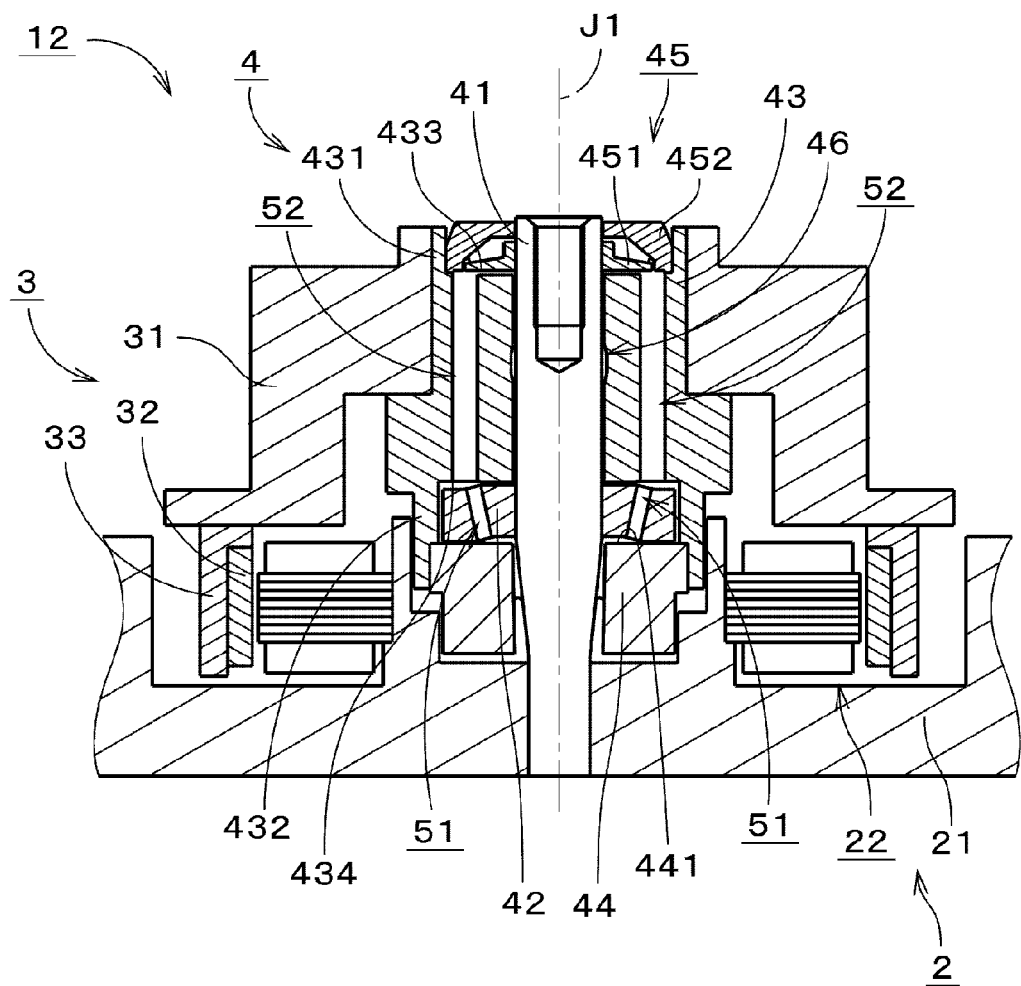
FIG. 2 is a section view of a motor according to the first preferred embodiment of the present invention.

FIG. 2 is a section view of the motor 12. The motor 12 is preferably an outer-rotor motor. The motor 12 includes a stationary portion 2, a rotating portion 3, and a fluid dynamic bearing mechanism (hereinafter referred to as a "bearing mechanism") 4. The rotating portion 3 is supported through the bearing mechanism 4 such that the rotating portion 3 is rotatable with respect to the stationary portion 2 about the central axis J1 of the motor 12.

The stationary portion 2 preferably includes a base bracket 21 and a stator 22. The base bracket 21 is attached to the first housing member 141 illustrated in FIG. 1, and is arranged to define a portion of the housing 14. The base bracket 21 includes a cylindrical holder, and the stator 22 is fixed around the holder. The base bracket 21 further includes a hole portion arranged radially inward of the holder.

The rotating portion 3 preferably includes a rotor hub 31, a rotor magnet 32, and a yoke 33. The rotor hub 31 is annular in shape. The yoke 33 is arranged to extend downward from a radially outer edge portion of the rotor hub 31 which is centered on the central axis J1. Note that the terms "radially", "radial", "radial direction", etc., as used herein refer to directions perpendicular or substantially perpendicular to the central axis J1. The rotor magnet 32 is fixed to an inner side surface of the yoke 33. The rotor magnet 32 is arranged radially opposite the stator 22 to produce a torque between the stator 22 and the rotor magnet 32.

The bearing mechanism 4 preferably includes a shaft 41, a thrust plate 42, a sleeve portion 43, a lower seal member 44, and a gap defining portion 45. The shaft 41 is fixed to the hole portion of the base bracket 21, and is arranged to extend in the vertical direction along the central axis J1. The thrust plate 42 is fixed to a middle portion of the shaft 41. The thrust plate 42 includes two communicating holes 51 defined therein. Each of the communicating holes 51 is preferably arranged obliquely to extend radially outward as it extends in an axially upward direction. Hereinafter, the communicating hole 51 will be referred to as a "plate communicating hole 51".

The sleeve portion 43 is arranged inside the rotor hub 31. The shaft 41 is arranged inside the sleeve portion 43. A first cylindrical portion 431, which is arranged to project upward, is arranged on an upper surface 433 of the sleeve portion 43. A second cylindrical portion 432, which is arranged to project downward, is arranged on a lower surface 434 of the sleeve portion 43. The sleeve portion 43 preferably includes two communicating holes 52 defined therein. The communicating holes 52 are arranged to extend parallel or substantially parallel with the central axis J1. Hereinafter, each of the communicating holes 52 will be referred to as a "sleeve communicating hole 52". When the sleeve communicating holes 52 and the plate communicating holes 51 are located at the same circumferential positions, upper end openings of the plate communicating holes 51 are located under the sleeve communicating holes 52.

The gap defining portion 45 preferably includes an annular thrust bushing 451 and an annular upper seal member 452. The upper seal member 452 is fixed to an inner side surface of the first cylindrical portion 431. The thrust bushing 451 is arranged radially inward of the upper seal member 452, and is fixed to the shaft 41. The thrust bushing 451 may define a portion of the shaft 41.

The thrust plate 42 is arranged below the lower surface 434 of the sleeve portion 43. The lower seal member 44 is arranged below a lower surface of the thrust plate 42, that is, on an opposite side of the thrust plate 42 with respect to the sleeve portion 43, and is fixed to an inner side surface of a bottom portion of the second cylindrical portion 432.

When the motor 12 is driven, the sleeve portion 43, the lower seal member 44, the upper seal member 452, and the rotating portion 3 are rotated through a lubricant 46 arranged within the bearing mechanism 4, with respect to the shaft 41, the thrust plate 42, and the thrust bushing 451. Note that the sleeve portion 43, the lower seal member 44, and the upper seal member 452 each define portions of the rotating portion 3 of the motor 12. Also note that the shaft 41 and the thrust plate 42 define portions of the stationary portion 2 of the motor 12. Because the motor 12 is a type of a motor whose shaft is stationary, the motor 12 is able to achieve a reduction in an amplitude of a particular vibration frequency that affects the disk drive apparatus 1 as compared to a type of a motor whose shaft is rotatable.

Figure 3:
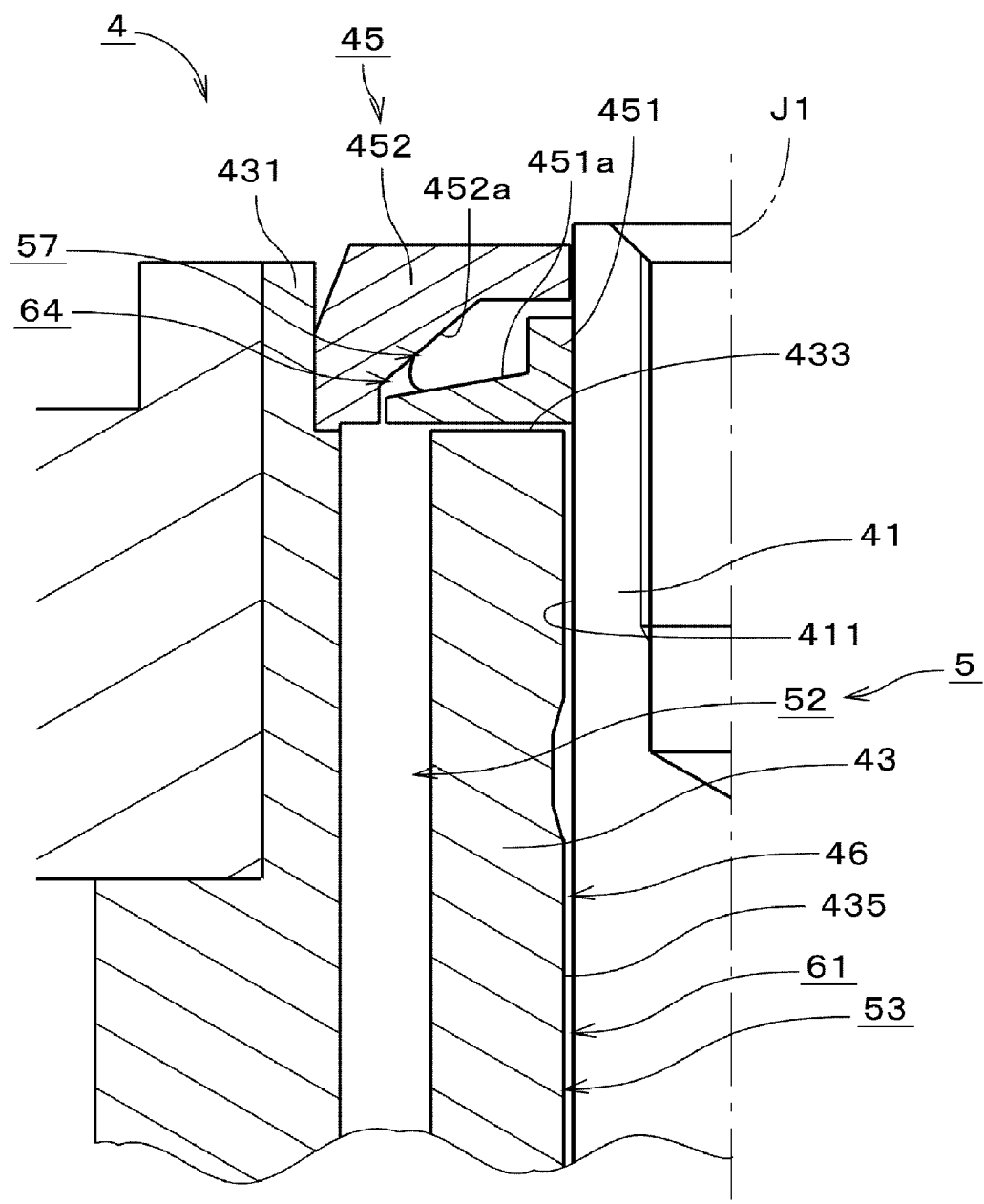
FIG. 3 is a section view of a bearing mechanism according to the first preferred embodiment of the present invention.
Figure 4:
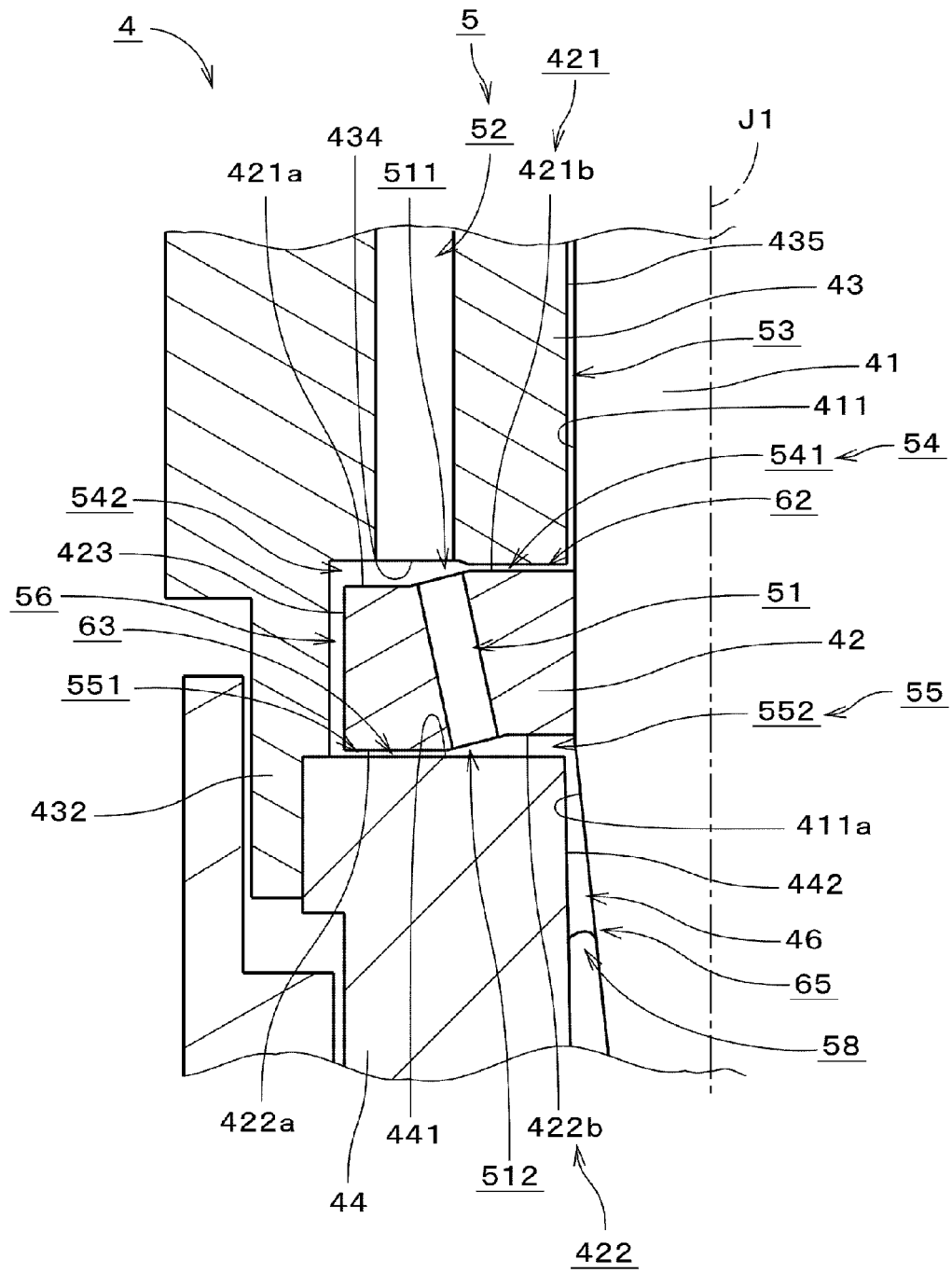
FIG. 4 is another section view of the bearing mechanism according to the first preferred embodiment of the present invention.

FIG. 3 is a section view illustrating an upper portion of the bearing mechanism 4 in an enlarged form. FIG. 4 is a section view illustrating a lower portion of the bearing mechanism 4 in an enlarged form. As illustrated in FIGS. 3 and 4, a gap 53 is defined between an outer side surface 411 of the shaft 41 and an inner side surface 435 of the sleeve portion 43. Hereinafter, the gap 53 will be referred to as a "radial gap 53". The size of the radial gap 53 is preferably in a range of about 2 μm to about 4 μm, for example. Because the sleeve portion 43 of the motor 12 is preferably defined by a single member, the inner side surface 435 of the sleeve portion 43 must be shaped with high precision such that the radial gap 53 will be defined with high precision. As illustrated in FIG. 4, a gap 54 is defined in a direction parallel or substantially parallel to the central axis J1 between an upper surface 421 of the thrust plate 42 and the lower surface 434 of the sleeve portion 43, which is arranged opposite the upper surface 421 of the thrust plate 42. Hereinafter, the gap 54 will be referred to as a "first thrust gap 54". In addition, a gap 55 is defined in the direction parallel or substantially parallel to the central axis J1 between a lower surface 422 of the thrust plate 42 and an upper surface 441 of the lower seal member 44, which is arranged opposite the lower surface 422 of the thrust plate 42. Hereinafter, the gap 55 will be referred to as a "second thrust gap 55".

The first and second thrust gaps 54 and 55 are connected with each other through the plate communicating holes 51. The first thrust gap 54 and a gap above the upper surface 433 of the sleeve portion 43 illustrated in FIG. 3 are connected with each other through the sleeve communicating holes 52. Both the outside diameter of each of the plate communicating holes 51 and the outside diameter of each of the sleeve communicating holes 52 are greater than any of the width of the radial gap 53, the width of the first thrust gap 54, and the width of the second thrust gap 55. In addition, as illustrated in FIG. 4, a gap 56 is defined between an outer side surface 423 of the thrust plate 42 and an inner side surface of the second cylindrical portion 432. Hereinafter, the gap 56 will be referred to as a "side gap 56".

As illustrated in FIG. 3, in the gap defining portion 45, the thrust bushing 451 is covered with the upper seal member 452. The thrust bushing 451 includes an inclined surface 451a arranged opposite the upper seal member 452. The inclined surface 451a is arranged to decrease in height as it spreads radially outward. The upper seal member 452 includes an inclined surface 452a arranged opposite the thrust bushing 451. The inclined surface 452a is arranged to decrease in height as it spreads radially outward. The inclined surface 451a is inclined at a greater angle to the central axis J1 than an angle at which the inclined surface 452a is inclined to the central axis J1.

An upper gap 57 is defined between the inclined surfaces 451a and 452a. The upper gap 57 is arranged to gradually increase in width as it extends upward, that is, as it approaches an open end of the upper gap 57. Moreover, the upper gap 57 is arranged to extend radially inward at an angle to the horizontal as it extends farther away from the upper surface 433 of the sleeve portion 43. A bottom of the upper gap 57 is positioned above the sleeve communicating holes 52. An upper capillary seal portion 64 is defined in the upper gap 57 to hold the lubricant 46. Portions of the inclined surfaces 451a and 452a which are outside of the lubricant 46 in the upper gap 57 are coated with oil-repellent films. The upper gap 57 is arranged to have a sufficient size to prevent the lubricant 46 from leaking out of the upper gap 57 even when the motor 12 is tilted with respect to the direction of gravity.

As illustrated in FIG. 4, a surface 411a which defines a lower portion of the outer side surface 411 of the shaft 41 and which is arranged opposite an inner side surface 442 of the lower seal member 44 includes an inclined surface arranged to radially approach the central axis J1 as it extends axially downward. Hereinafter, the surface 411a which is arranged opposite the inner side surface 442 of the lower seal member 44 will be referred to as an "inclined surface 411a". A lower gap 58 is defined between the inner side surface 442 and the inclined surface 411a. The lower gap 58 is arranged to gradually increase in width as it extends downward, that is, as it approaches an open end of the lower gap 58. A lower capillary seal portion 65 is defined in the lower gap 58 to hold the lubricant 46. Oil-repellent films are arranged at predetermined positions in the lower gap 58 in a manner similar to that in which the oil-repellent films are arranged in the upper gap 57. The lower gap 58 is arranged to have a sufficient size to prevent the lubricant 46 from leaking out of the lower gap 58 even when the motor 12 is tilted. Taking account of an amount of the lubricant 46 that will evaporate out of the motor 12, a sufficient amount of the lubricant 46 is held in the lower gap 58 to allow the bearing mechanism 4 to have a long life.

Referring to FIGS. 3 and 4, the lubricant 46 is continuously arranged in a channel in the bearing mechanism 4 which extends from the upper capillary seal portion 64 to the lower capillary seal portion 65 through the radial gap 53, the first thrust gap 54, the side gap 56, and the second thrust gap 55. Furthermore, the lubricant 46 is continuously arranged also in the plate communicating holes 51 and the sleeve communicating holes 52.

In the bearing mechanism 4, an angle defined by the lower gap 58 is arranged to be smaller than an angle defined by the upper gap 57 illustrated in FIG. 3. The angle defined by the lower gap 58 refers to an angle defined between the inner side surface 442 of the lower seal member 44 and the inclined surface 411a of the shaft 41. The angle defined by the upper gap 57 refers to an angle defined between the inclined surface 451a of the thrust bushing 451 and the inclined surface 452a of the upper seal member 452.

Moreover, a portion of the lubricant 46 which is held in the lower gap 58 is arranged to have a greater length than that of a portion of the lubricant 46 which is held in the upper gap 57. Here, the length of the portion of the lubricant 46 which is held in the upper gap 57 refers to a distance between the bottom of the upper gap 57 and an upper surface of the lubricant 46 on a plane that bisects the angle defined between the inclined surfaces 451a and 452a. Similarly, the length of the portion of the lubricant 46 which is held in the lower gap 58 refers to a distance between an upper end of the lower gap 58 and a lower surface of the lubricant 46 on a plane that bisects the angle defined between the inner side surface 442 and the inclined surface 411a.

Figure 5:
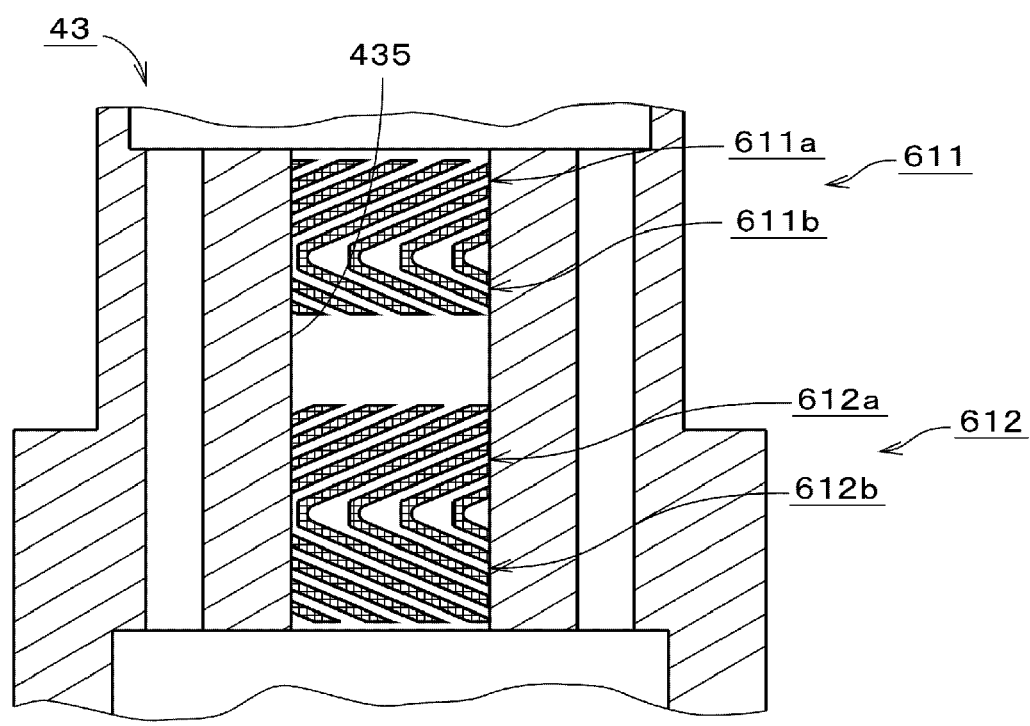
FIG. 5 is a section view of a sleeve portion according to the first preferred embodiment of the present invention.

FIG. 5 is a section view of the sleeve portion 43. In FIG. 5, configurations of portions of the sleeve portion 43 which are beyond a section of the sleeve portion 43 are also shown, and dynamic pressure grooves are indicated by cross-hatching. Also in other figures referenced below, dynamic pressure grooves are indicated by cross-hatching. The sleeve portion 43 includes first radial dynamic pressure grooves 611 arranged in an upper portion of the inner side surface 435 thereof, and second radial dynamic pressure grooves 612 arranged in a lower portion of the inner side surface 435 thereof. The first radial dynamic pressure grooves 611 are preferably arranged in a herringbone pattern, with each of the first radial dynamic pressure grooves 611 arranged substantially in the shape of the letter "V" oriented horizontally in a circumferential direction of the inner side surface 435. Hereinafter, an upper portion and a lower portion of each of the first radial dynamic pressure grooves 611 will be referred to as a "groove upper portion 611a" and a "groove lower portion 611b", respectively. The groove lower portion 611b is arranged to be shorter than the groove upper portion 611a. Meanwhile, a groove upper portion 612a and a groove lower portion 612b of each of the second radial dynamic pressure grooves 612 are arranged to have substantially the same length. A radial bearing portion 61 is defined in the radial gap 53 illustrated in FIG. 3 to generate a fluid dynamic pressure acting in a radial direction on the lubricant 46.

Figure 6:
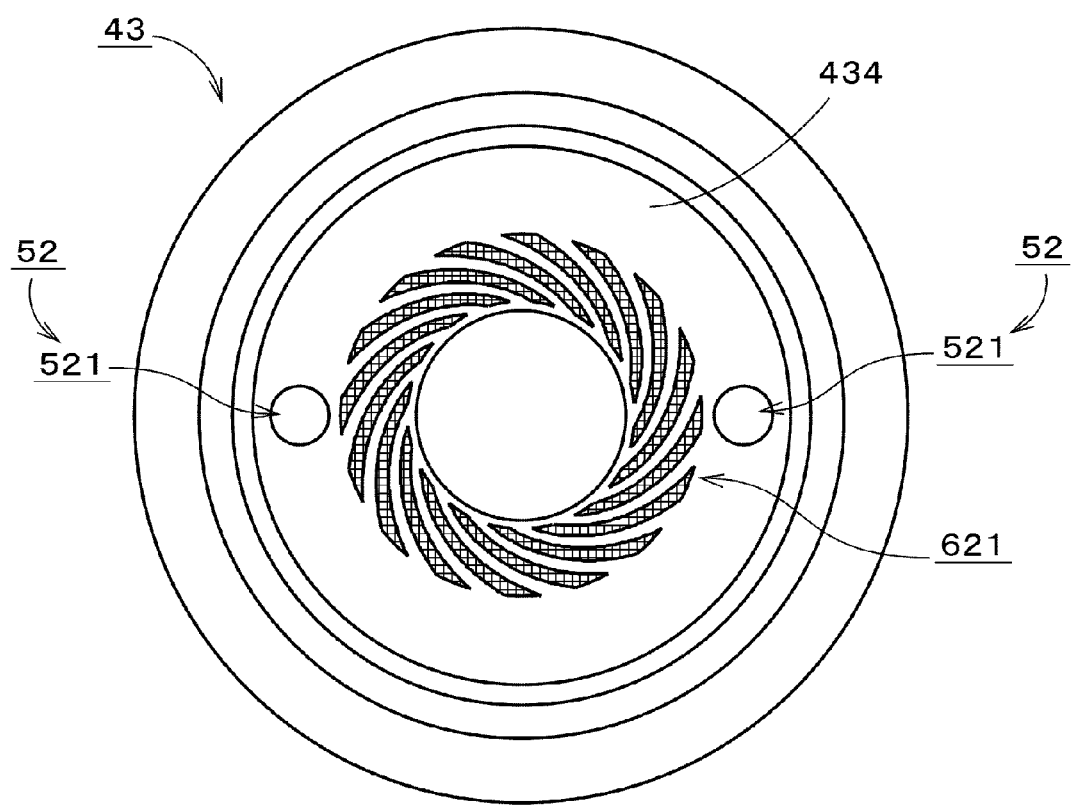
FIG. 6 is a bottom view of the sleeve portion according to the first preferred embodiment of the present invention.

FIG. 6 is a bottom view of the sleeve portion 43. First thrust dynamic pressure grooves 621 in a spiral pattern are defined in the lower surface 434 of the sleeve portion 43 through electrochemical machining. Openings 521 at lower ends of the sleeve communicating holes 52 are arranged radially outward of the first thrust dynamic pressure grooves 621. Hereinafter, the openings 521 will be referred to as "lower end openings 521". Openings 511 at upper ends of the plate communicating holes 51, which are defined in the upper surface 421 of the thrust plate 42 illustrated in FIG. 4, are arranged radially outward of the first thrust dynamic pressure grooves 621 illustrated in FIG. 6. Hereinafter, the openings 511 will be referred to as "upper end openings 511". The upper surface 421 of the thrust plate 42 includes an outer annular surface 421a arranged radially outward of the upper end openings 511 of the plate communicating holes 51, and an inner annular surface 421b arranged radially inward of the upper end openings 511. The outer annular surface 421a is arranged at a level lower than that of the inner annular surface 421b. The first thrust gap 54 includes a minute gap 541 defined between the inner annular surface 421b and the lower surface 434 of the sleeve portion 43, and the width of the minute gap 541 defined in a direction parallel or substantially parallel to the central axis J1 is small. A first thrust bearing portion 62 is defined in the minute gap 541 to generate a fluid dynamic pressure acting in a thrust direction on the lubricant 46.

The plate communicating holes 51 are arranged to be connected with the sleeve communicating holes 52 through a gap 542 defined between the outer annular surface 421a and the lower surface 434 of the sleeve portion 43. Hereinafter, the gap 542 will be referred to as a "first connection gap 542". The width of the first connection gap 542 defined in the direction parallel or substantially parallel to the central axis J1 is arranged to be greater than that of the minute gap 541. No dynamic pressure groove is defined in the first connection gap 542, and the first connection gap 542 does not function as a thrust bearing portion.

Figure 7:
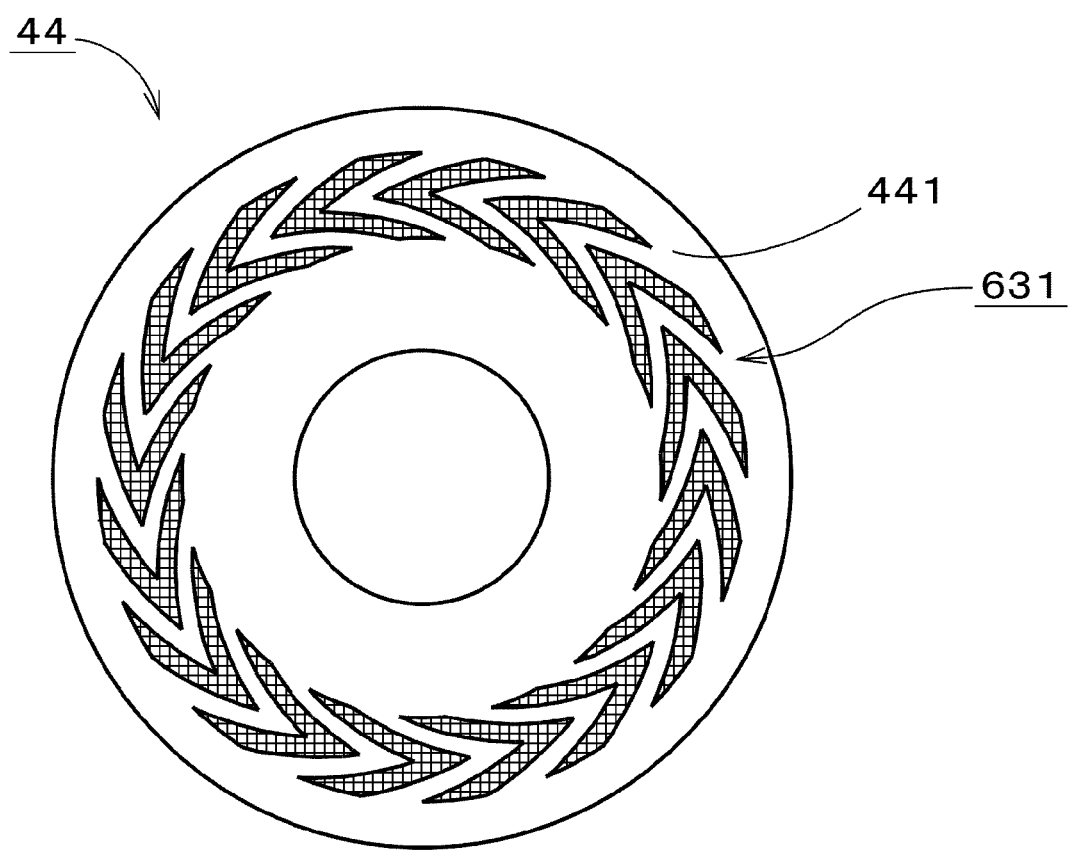
FIG. 7 is a plan view of a lower seal member according to the first preferred embodiment of the present invention.

FIG. 7 is a plan view of the lower seal member 44. Second thrust dynamic pressure grooves 631 in a herringbone pattern are defined in the upper surface 441 of the lower seal member 44. The length of a radially inner portion of each second thrust dynamic pressure groove 631 is arranged to be slightly greater than the length of a radially outer portion of the second thrust dynamic pressure groove 631 to ensure a proper balance of dynamic pressure. The second thrust dynamic pressure grooves 631 are defined through the electrochemical machining. Openings 512 at lower ends of the plate communicating holes 51 illustrated in FIG. 4 are arranged radially inward of the second thrust dynamic pressure grooves 631 illustrated in FIG. 7. Hereinafter, the openings 512 will be referred to as a "lower end openings 512".

Referring to FIG. 4, the lower surface 422 of the thrust plate 42 includes an outer annular surface 422a arranged radially outward of the lower end openings 512 of the plate communicating holes 51, and an inner annular surface 422b arranged radially inward of the lower end openings 512. The outer annular surface 422a is arranged at a level lower than that of the inner annular surface 422b. The second thrust gap 55 includes a minute gap 551 defined between the outer annular surface 422a and the upper surface 441 of the lower seal member 44, and the width of the minute gap 551 defined in the direction parallel or substantially parallel to the central axis J1 is small. A second thrust bearing portion 63 is defined in the minute gap 551 to generate a fluid dynamic pressure acting in the thrust direction on the lubricant 46.

The second thrust gap 55 further includes a gap 552 defined between the inner annular surface 422b and the upper surface 441 of the lower seal member 44, and the plate communicating holes 51 and the lower gap 58 are arranged to be connected with each other through the gap 552. Hereinafter, the gap 552 will be referred to as a "second connection gap 552". The width of the second connection gap 552 defined in the direction parallel or substantially parallel to the central axis J1 is arranged to be greater than that of the minute gap 551. No dynamic pressure groove is defined in the second connection gap 552, and the second connection gap 552 does not function as a thrust bearing portion.

In the thrust plate 42, each of the plate communicating holes 51 is arranged to extend obliquely. The plate communicating hole 51 is arranged to connect the first connection gap 542, which is a region radially outward of the first thrust bearing portion 62, and the second connection gap 552, which is a region radially inward of the second thrust bearing portion 63, with each other. The above arrangement makes it possible to increase the size of each of the first and second thrust bearing portions 62 and 63 as compared to when each of the plate communicating holes 51 is arranged to extend parallel or substantially parallel with the central axis J1.

In the bearing mechanism 4, the upper gap 57 illustrated in FIG. 3 and the lower gap 58 are arranged in communication with each other through the sleeve communicating holes 52, the first connection gap 542, the plate communicating holes 51, and the second connection gap 552. Hereinafter, the sleeve communicating holes 52, the first connection gap 542, the plate communicating holes 51, and the second connection gap 552 will be referred to collectively as a "communicating channel 5".

While the motor 12 is driven, the sleeve portion 43 is supported in the radial direction with respect to the shaft 41 through the radial bearing portion 61 illustrated in FIG. 3. The sleeve portion 43 and the lower seal member 44 are supported in the thrust direction with respect to the thrust plate 42 through the first and second thrust bearing portions 62 and 63 illustrated in FIG. 4.

At this time, the first and second radial dynamic pressure grooves 611 and 612 illustrated in FIG. 5 serve to pump the lubricant 46 to a middle of each of the first and second radial dynamic pressure grooves 611 and 612 to generate a sufficient dynamic pressure. Because the groove lower portion 611b of each of the first radial dynamic pressure grooves 611 is arranged to be shorter than the groove upper portion 611a thereof as described above, a downward pressure is applied to the lubricant 46 in the first radial dynamic pressure grooves 611. Meanwhile, because the groove lower portion 612b and the groove upper portion 612a of each of the second radial dynamic pressure grooves 612 are arranged to have substantially the same length, almost no pressure is applied to the lubricant 46 either upward or downward in the second radial dynamic pressure grooves 612. As a result, with respect to the radial gap 53 illustrated in FIG. 4 as a whole, a pressure acting in the direction of the thrust plate 42 is applied to the lubricant 46 in the radial gap 53.

Meanwhile, because the first thrust dynamic pressure grooves 621 in the spiral pattern illustrated in FIG. 6 are arranged in the minute gap 541 of the first thrust gap 54, a pressure acting in the direction of the shaft 41 is applied to the lubricant 46 in the minute gap 541. The above arrangement contributes to preventing the generation of air bubbles because the lubricant 46 is thereby placed under high pressure around an intersection of the radial gap 53 and the first thrust gap 54. In the minute gap 551 of the second thrust gap 55, the radially outer portion of each of the second thrust dynamic pressure grooves 631 illustrated in FIG. 7 is arranged to move in the circumferential direction at a higher speed than the radially inner portion thereof. Therefore, the radially inner portion of the second thrust dynamic pressure groove 631 is arranged to have a slightly greater length than that of the radially outer portion thereof to ensure a proper balance of dynamic pressure.

The lubricant 46 is arranged to flow through the radial gap 53, the first thrust gap 54 illustrated in FIG. 4, the sleeve communicating holes 52, and the gap defined between the upper surface 433 of the sleeve portion 43 and the lower surface of the thrust bushing 451 illustrated in FIG. 3.

The motor 12 according to the first preferred embodiment has been described above. In the bearing mechanism 4, the communicating channel 5 is defined which is arranged to extend from the upper capillary seal portion 64 to the lower capillary seal portion 65 through the sleeve communicating holes 52, the first connection gap 542, the plate communicating holes 51, and the second connection gap 552. If it were not for the plate communicating holes 51, the first and second thrust bearing portions 62 and 63 would exist within the channel between the upper and lower gaps 57 and 58, and a difference in pressure between the upper and lower gaps 57 and 58 might result. In actuality, however, no dynamic pressure generation portion that generates a fluid dynamic pressure through dynamic pressure grooves exists within the communicating channel 5 of the bearing mechanism 4, and thus, the pressure is substantially equal throughout the communicating channel 5.

Because the communicating channel 5 is defined in the bearing mechanism 4, a difference in pressure does not occur between the upper and lower capillary seal portions 64 and 65, or only such a slight difference in pressure occurs between the upper and lower capillary seal portions 64 and 65 that the function of the bearing mechanism 4 as a bearing may not be impaired, and a leakage of the lubricant 46 through either the upper gap 57 or the lower gap 58 is easily prevented. In the bearing mechanism 4, the plate communicating holes 51 and the sleeve communicating holes 52 are arranged in the thrust plate 42 and the sleeve portion 43, respectively, to define the communicating channel 5. The communicating channel 5 is thus arranged more easily than if the communicating channel were defined in the shaft 41 to connect the upper and lower gaps 57 and 58 with each other.

Because the first and second thrust bearing portions 62 and 63 are arranged above and below the thrust plate 42, respectively, there is no need to arrange a thrust bearing portion between the thrust bushing 451 and the sleeve portion 43. This eliminates the need to fix the thrust bushing 451 to the shaft 41 with high precision considering the position of the thrust bushing 451 relative to the upper surface 433 of the sleeve portion 43. The thrust plate 42 being arranged in the above-described manner with respect to the shaft 41 contributes to increased flexibility in designing other members of the bearing mechanism 4.

Concerning the lower gap 58, the radially inner portion of each second thrust dynamic pressure groove 631 is arranged to have a slightly greater length than that of the radially outer portion of the second thrust dynamic pressure groove 631 to ensure a proper balance of dynamic pressure. This contributes to reducing unwanted circulation of the lubricant 46. The upper gap 57 is arranged to tilt radially toward the central axis J1 as it extends upward. Therefore, during rotation of the motor 12, a centrifugal force acting in the direction of an interior of the upper gap 57 is applied to a portion of the lubricant 46 which is arranged in the upper capillary seal portion 64, to more effectively prevent a leakage of the lubricant 46. This contributes to facilitating the design of the motor 12. The provision of the second thrust bearing portion 63 and the provision of the lower capillary seal portion 65 inside an inner circumference of the lower seal member 44 contribute to reducing the number of components of the motor 12. The same is true of a second preferred embodiment of the present invention described below.

In a motor in which a shaft is rotatable, a rotor hub and the shaft are fixed to each other in an upper portion of a bearing mechanism. The motor of this type therefore has a so-called top-heavy structure, with the center of gravity located in an upper portion of the motor. In the motor 12, the first and second thrust bearing portions 62 and 63 are arranged in the lower portion of the bearing mechanism 4, and the radial bearing portion 61 is accordingly arranged in the upper portion of the bearing mechanism 4. This arrangement makes it possible to locate the radial bearing portion 61 closer to the center of gravity of the motor 12.

Furthermore, because the axial dimension of the lower gap 58, which is arranged close to the base bracket 21, is arranged to be greater than the axial dimension of the upper gap 57, the first and second thrust bearing portions 62 and 63 and the radial bearing portion 61 can be located at higher positions in the bearing mechanism 4. This allows the center of gravity of the bearing mechanism 4 and the rotating portion 3 of the motor 12 illustrated in FIG. 2 to be located between the first and second radial dynamic pressure grooves 611 and 612, whereby runout that accompanies the rotation of the rotating portion 3 is reduced.

The bearing mechanism 4 has a relatively small number of locations to which an oil-repellent agent is applied to define the oil-repellent films. This contributes to reducing the number of processes required to construct the bearing mechanism 4. Management of the amount of the lubricant 46 injected can be exercised by checking the position of the lower surface of the lubricant 46 in the lower capillary seal portion 65 in the lower gap 58. This method offers easier management of the amount of the lubricant 46 injected as compared to, for example, when the amount of the lubricant 46 injected is checked by calculating a difference between the weight of the bearing mechanism 4 before injection of the lubricant 46 and the weight of the bearing mechanism 4 after the injection of the lubricant 46.

Figure 8:
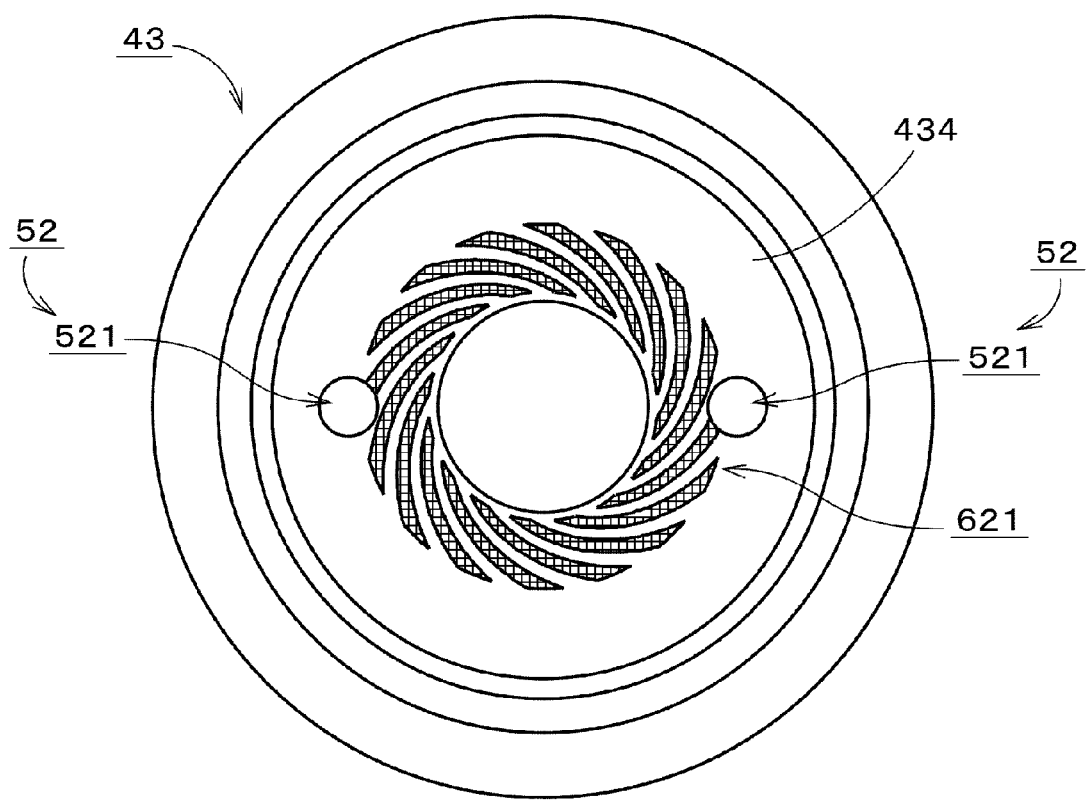
FIG. 8 is a bottom view of a sleeve portion according to an example modification of the first preferred embodiment of the present invention.

Each of the plate communicating holes 51 is arranged to avoid a portion of a surface of the thrust plate 42 which defines the first thrust bearing portion 62, and a portion of a surface of the thrust plate 42 which defines the second thrust bearing portion 63. This contributes to reducing a bearing loss. Moreover, the spiral pattern of the first thrust dynamic pressure grooves 621 contributes to a further reduction in the bearing loss. Referring to FIG. 8, concerning the first thrust gap 54 of the bearing mechanism 4, a portion of the lower end opening 521 of each of the sleeve communicating holes 52 may be arranged in a region in which the first thrust dynamic pressure grooves 621 are arranged, as long as a significant difference in pressure does not occur between the upper and lower capillary seal portions 64 and 65, or as long as only such a slight difference in pressure occurs between the upper and lower capillary seal portions 64 and 65 that the function of the bearing mechanism 4 as a bearing may not be impaired. In this case, the remaining portion of the lower end opening 521 is arranged radially outward of the first thrust dynamic pressure grooves 621, that is, radially outward of the first thrust bearing portion 62.

Similarly, a portion of the upper end opening 511 of each of the plate communicating holes 51 illustrated in FIG. 4 may be arranged to coincide, in the direction parallel or substantially parallel to the central axis J1, with the region in which the first thrust dynamic pressure grooves 621 illustrated in FIG. 8 are arranged. In this case, the remaining portion of the upper end opening 511 is arranged radially outward of the first thrust dynamic pressure grooves 621. Also, concerning the second thrust gap 55, a portion of the lower end opening 512 of each of the plate communicating holes 51 may be arranged to coincide, in the direction parallel or substantially parallel to the central axis J1, with a region in which the second thrust dynamic pressure grooves 631 illustrated in FIG. 7 are arranged. In this case, the remaining portion of the lower end opening 512 is arranged radially inward of the second thrust dynamic pressure grooves 631, that is, radially inward of the second thrust bearing portion 62.

Figure 9:
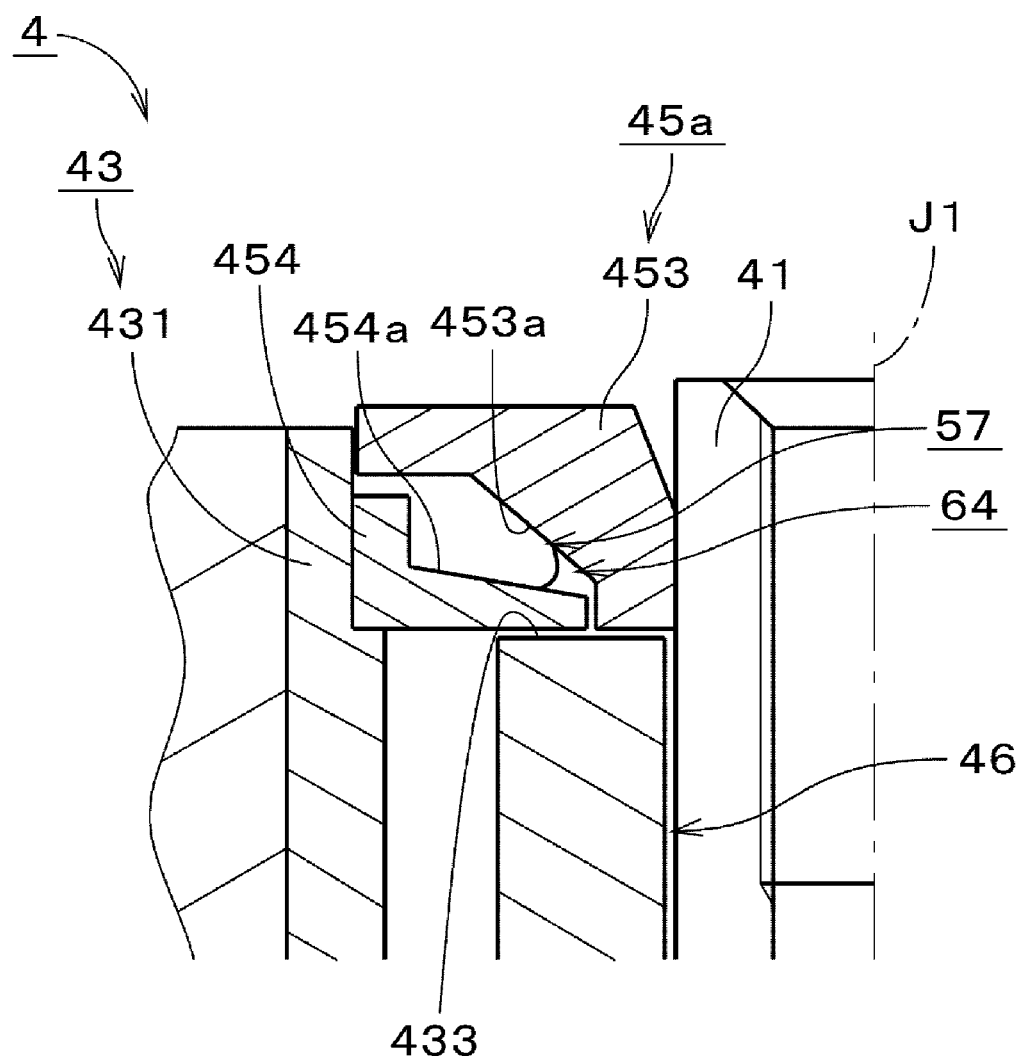
FIG. 9 is a diagram illustrating a gap defining portion according to an example modification of the first preferred embodiment of the present invention.

FIG. 9 is a diagram illustrating a gap defining portion 45a according to an example modification of the first preferred embodiment. A section of the gap defining portion 45a taken along an axial plane including the central axis J1 is substantially similar to a section of the gap defining portion 45 illustrated in FIG. 3 flipped from side to side. An annular bushing 453 is fixed to the shaft 41, and is arranged to cover an annular upper seal member 454, which is fixed to the first cylindrical portion 431 of the sleeve portion 43. The bushing 453 includes an inclined surface 453a arranged opposite the upper seal member 454. The upper seal member 454 includes an inclined surface 454a arranged opposite the bushing 453. Each of the inclined surfaces 453a and 454a is arranged to decrease in height as it extends radially inward. In addition, the inclined surface 454a is inclined at a greater angle with respect to the central axis J1 than an angle at which the inclined surface 453a is inclined radially toward the central axis J1.

An upper gap 57 is defined between the inclined surfaces 453a and 454a. The upper gap 57 is arranged to gradually increase in width as it extends upward. An upper capillary seal portion 64 is defined in the upper gap 57 to hold the lubricant 46. The upper gap 57 is arranged to approach the first cylindrical portion 431 at an angle to the horizontal as it extends farther away from the upper surface 433 of the sleeve portion 43. The angle defined by the upper gap 57 is arranged to be greater than the angle defined by the lower gap 58 illustrated in FIG. 4. A portion of the lubricant 46 which is held in the upper gap 57 is arranged to have a smaller length than that of the portion of the lubricant 46 which is held in the lower gap 58. Because no thrust bearing portion is defined between the bushing 453 and the sleeve portion 43 of the bearing mechanism 4, there is no need to fix the bushing 453 to the shaft 41 with high precision considering the position of the bushing 453 relative to the sleeve portion 43.

Figure 10:
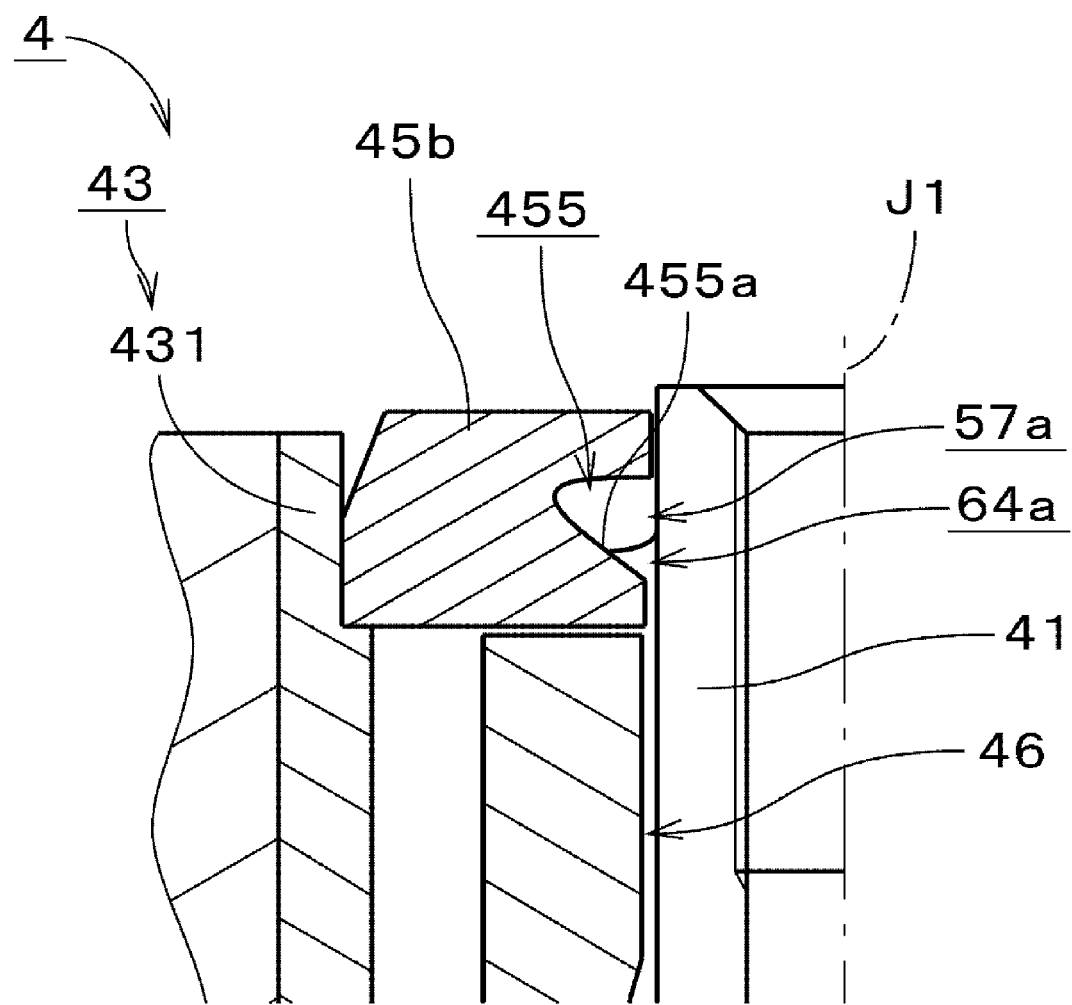
FIG. 10 is a diagram illustrating a gap defining portion according to another example modification of the first preferred embodiment of the present invention.

FIG. 10 is a diagram illustrating a gap defining portion 45b according to another example modification of the first preferred embodiment. The gap defining portion 45b is preferably arranged in an annular shape, and fixed to the first cylindrical portion 431 of the sleeve portion 43. An annular groove portion 455 is defined in an inner side surface of the gap defining portion 45b. A surface 455a of the groove portion 455 which is defined on a lower side in the direction parallel or substantially parallel to the central axis J1 includes an inclined surface arranged to decrease in an axial height as it radially approaches the shaft 41. Hereinafter, the surface 455a will be referred to as an "inclined surface 455a". An upper gap 57a is defined between the inclined surface 455a and the shaft 41. The upper gap 57a is arranged to gradually increase in width as it extends upward. An upper capillary seal portion 64a is defined in the upper gap 57a to hold the lubricant 46. As is the case with the upper gaps 57 illustrated in FIGS. 3 and 9, respectively, an angle defined by the upper gap 57a is arranged to be greater than the angle defined by the lower gap 58 illustrated in FIG. 4. A portion of the lubricant 46 which is held in the upper gap 57a is arranged to have a smaller length than that of the portion of the lubricant 46 which is held in the lower gap 58. Moreover, because the gap defining portion 45b is defined by a single member, it is possible to reduce the number of components of the bearing mechanism 4.

Figure 11:
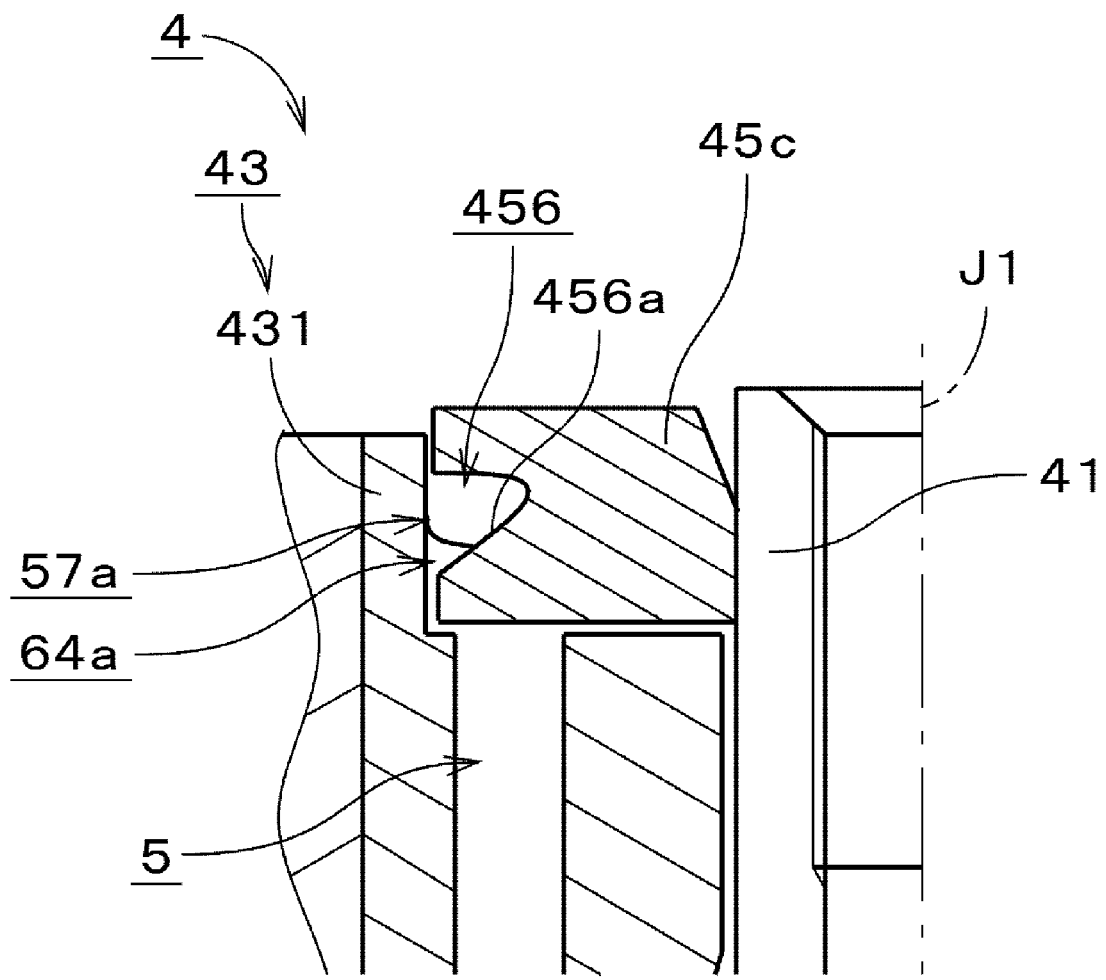
FIG. 11 is a diagram illustrating a gap defining portion according to yet another example modification of the first preferred embodiment of the present invention.

FIG. 11 is a diagram illustrating a gap defining portion 45c according to yet another example modification of the first preferred embodiment. The gap defining portion 45c is arranged in an annular shape. A section of the gap defining portion 45c taken along an axial plane including the central axis J1 is substantially similar to a section of the gap defining portion 45b illustrated in FIG. 10 flipped from side to side. The gap defining portion 45c is fixed to the shaft 41. An annular groove portion 456 is defined in an outer side surface of the gap defining portion 45c. The groove portion 456 includes an inclined surface 456a arranged to decrease in axial height as it radially approaches the first cylindrical portion 431 of the sleeve portion 43. An upper gap 57a is defined between the inclined surface 456a and the first cylindrical portion 431. The upper gap 57a is arranged to gradually increase in width as it extends upward. As is the case with the gap defining portion 45b illustrated in FIG. 10, the gap defining portion 45c of the bearing mechanism 4 is defined by a single member, and thus makes it possible to reduce the number of components of the bearing mechanism 4. Because a centrifugal force acting in the direction of an interior of the communicating channel 5 is applied to an upper capillary seal portion 64a in the gap defining portion 45c, a leakage of the lubricant 46 is prevented more effectively.

Figure 12:
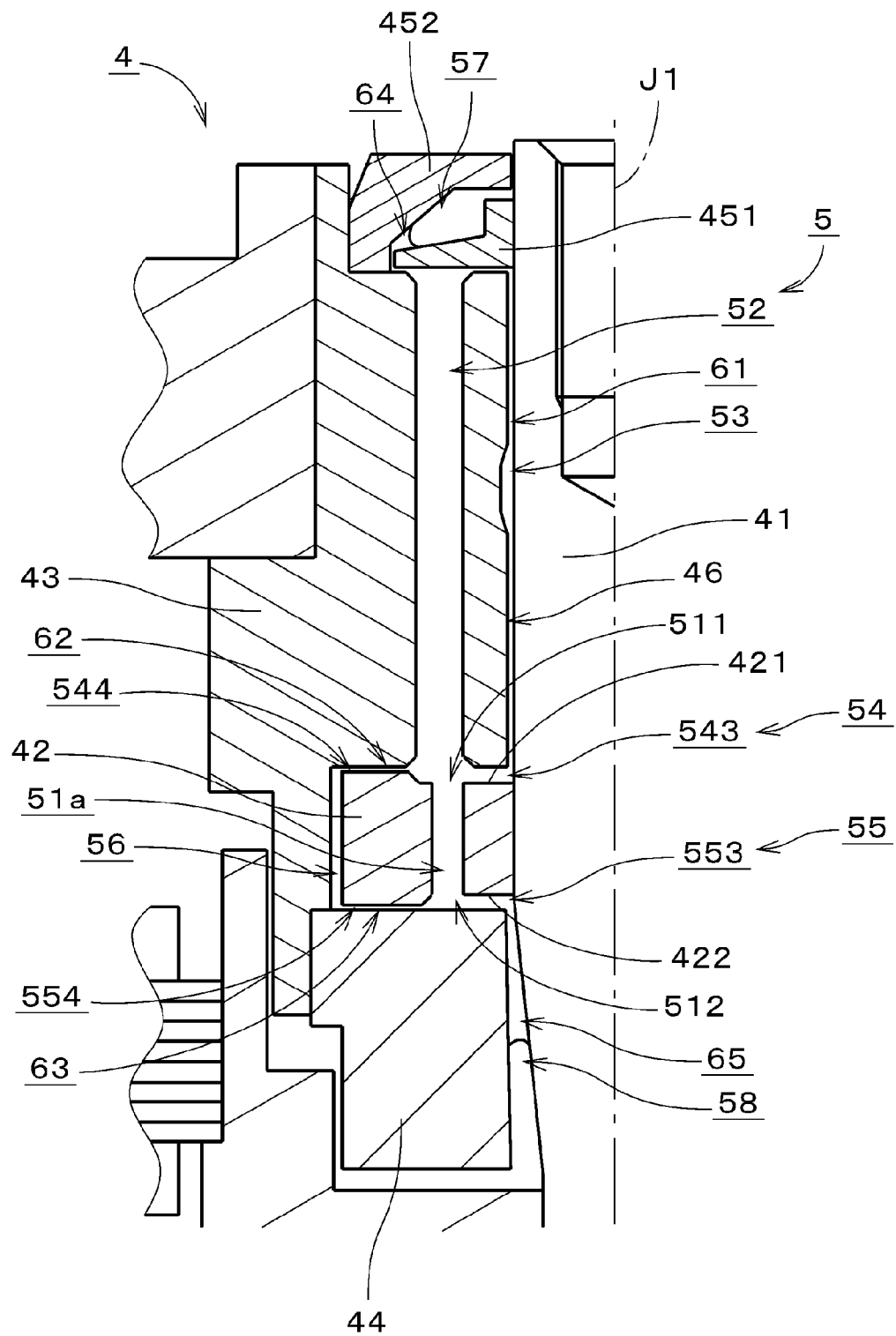
FIG. 12 is a section view of a bearing mechanism in a motor according to a second preferred embodiment of the present invention.

FIG. 12 is a diagram illustrating a bearing mechanism 4 of a motor 12 according to the second preferred embodiment of the present invention. The bearing mechanism 4 includes plate communicating holes 51a arranged in a thrust plate 42 to extend parallel or substantially parallel to the central axis J1. Regarding an upper surface 421 of the thrust plate 42, a radially inner portion of the upper surface 421 is arranged at a level lower than that of a radially outer portion of the upper surface 421. A first thrust gap 54 defined between the thrust plate 42 and a sleeve portion 43 includes a first connection gap 543 arranged radially inward. Sleeve communicating holes 52 are arranged to be connected with the plate communicating holes 51a through the first connection gap 543. Regarding a lower surface 422 of the thrust plate 42, a radially inner portion of the lower surface 422 is arranged at a level higher than that of a radially outer portion of the lower surface 422. A second thrust gap 55 defined between the thrust plate 42 and a lower seal member 44 includes a second connection gap 553 arranged radially inward. The plate communicating holes 51a are arranged to be connected with a lower gap 58 through the second connection gap 553. The structure of the bearing mechanism 4 according to the second preferred embodiment is otherwise substantially similar to that of the bearing mechanism 4 according to the first preferred embodiment except in the shape of dynamic pressure grooves described below. In the following description, portions that have their counterparts in the first preferred embodiment will be denoted by the same reference numerals as those of their counterparts in the first preferred embodiment. The bearing mechanism 4 according to the second preferred embodiment includes a communicating channel 5 arranged to connect an upper gap 57 and the lower gap 58 with each other through the sleeve communicating holes 52, the first connection gap 543, the plate communicating holes 51a, and the second connection gap 553.

Figure 13:
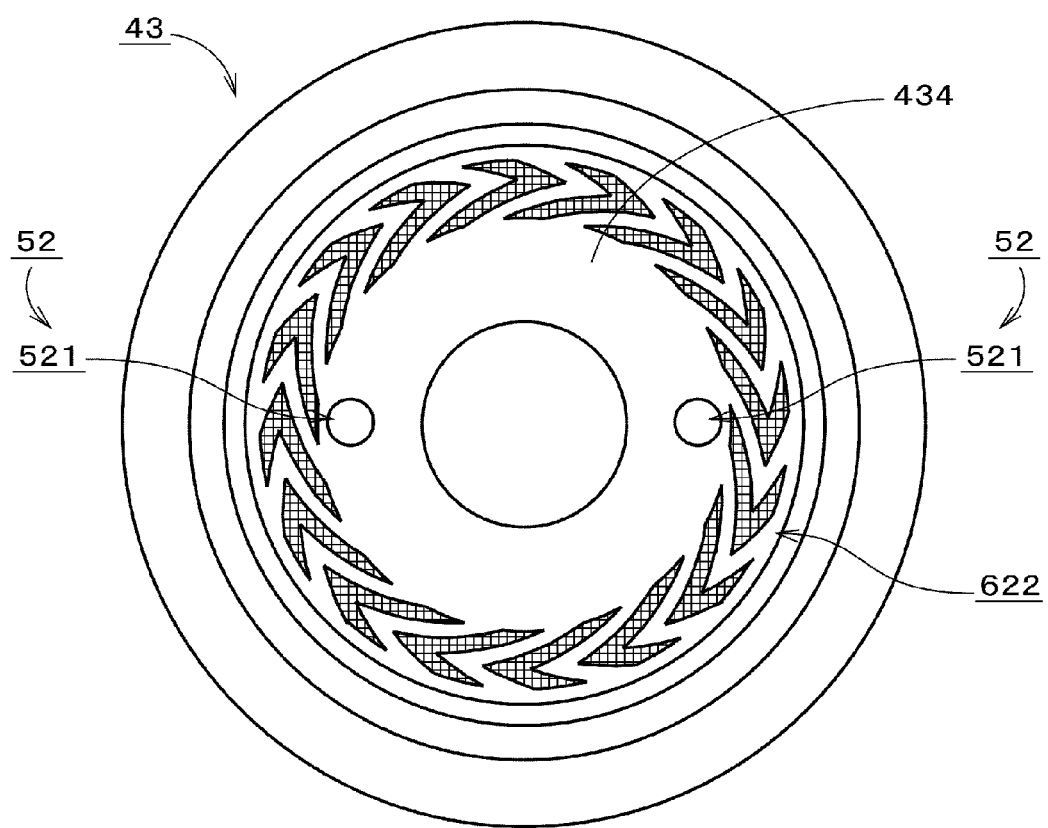
FIG. 13 is a bottom view of a sleeve portion according to the second preferred embodiment of the present invention.

FIG. 13 is a bottom view of the sleeve portion 43. A lower surface 434 of the sleeve portion 43 includes first thrust dynamic pressure grooves 622 in a herringbone pattern defined therein. The length of a radially outer portion of each of the first thrust dynamic pressure grooves 622 is arranged to be smaller than that of a radially inner portion of the first thrust dynamic pressure groove 622. A lower end opening 521 of each sleeve communicating hole 52 is arranged radially inward of the first thrust dynamic pressure grooves 622. Similarly, an upper end opening 511 of each plate communicating hole 51a illustrated in FIG. 12 is also arranged radially inward of the first thrust dynamic pressure grooves 622. The first thrust gap 54 includes a minute gap 544 arranged radially outward of the first connection gap 543, and a first thrust bearing portion 62 is defined in the minute gap 544. The first thrust bearing portion 62 is arranged to function as a bearing portion of an out-pump type which generates a radially outward pressure in a lubricant 46.

Figure 14:
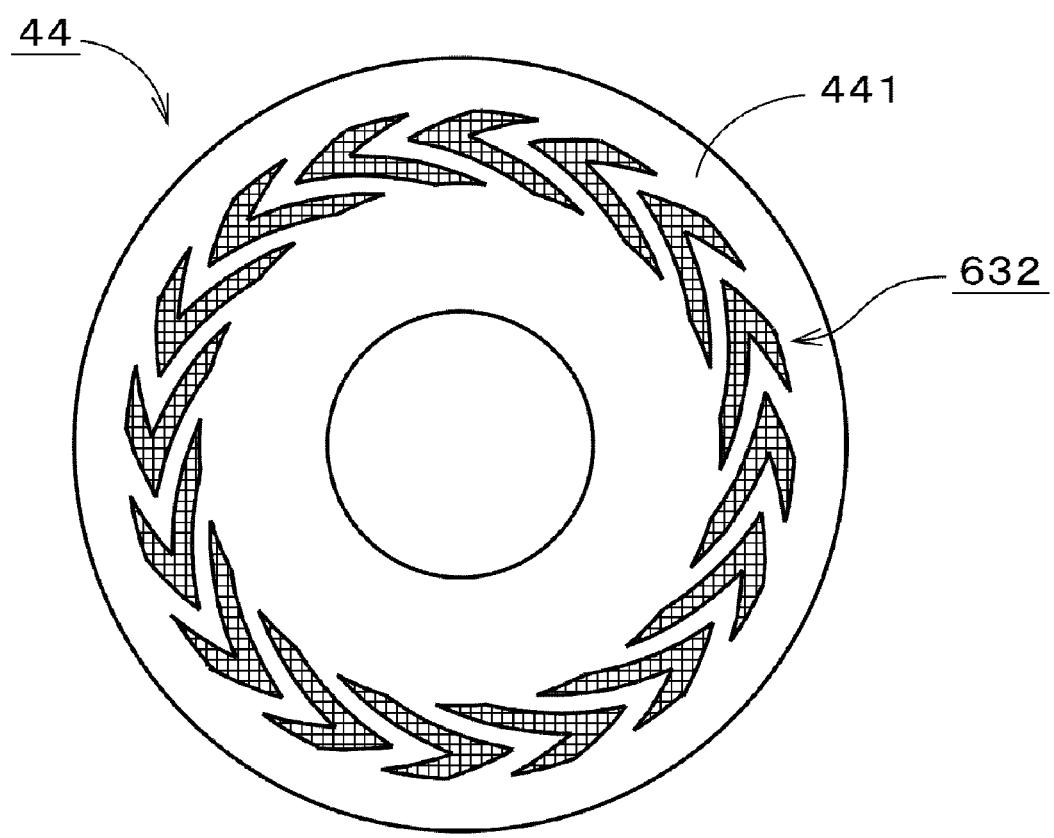
FIG. 14 is a plan view of a lower seal member according to the second preferred embodiment of the present invention.

FIG. 14 is a plan view of the lower seal member 44. An upper surface 441 of the lower seal member 44 includes second thrust dynamic pressure grooves 632 in a herringbone pattern defined therein. The length of a radially outer portion of each of the second thrust dynamic pressure grooves 632 is arranged to be smaller than that of a radially inner portion of the second thrust dynamic pressure groove 632. The second thrust dynamic pressure grooves 632 are arranged toward an outer circumference of the upper surface 441. A lower end opening 512 of each plate communicating hole 51a illustrated in FIG. 12 is arranged radially inward of the second thrust dynamic pressure grooves 632. The second thrust gap 55 includes a minute gap 554 arranged radially outward of the second connection gap 553, and a second thrust bearing portion 63 of the out-pump type is defined in the minute gap 554.

While the motor 12 is driven, the first and second thrust bearing portions 62 and 63 are arranged to support the sleeve portion 43 and the lower seal member 44 in the thrust direction with respect to the thrust plate 42, and apply to the lubricant 46 pressures acting in the direction of a side gap 56 arranged radially outside the thrust plate 42.

Figure 15:
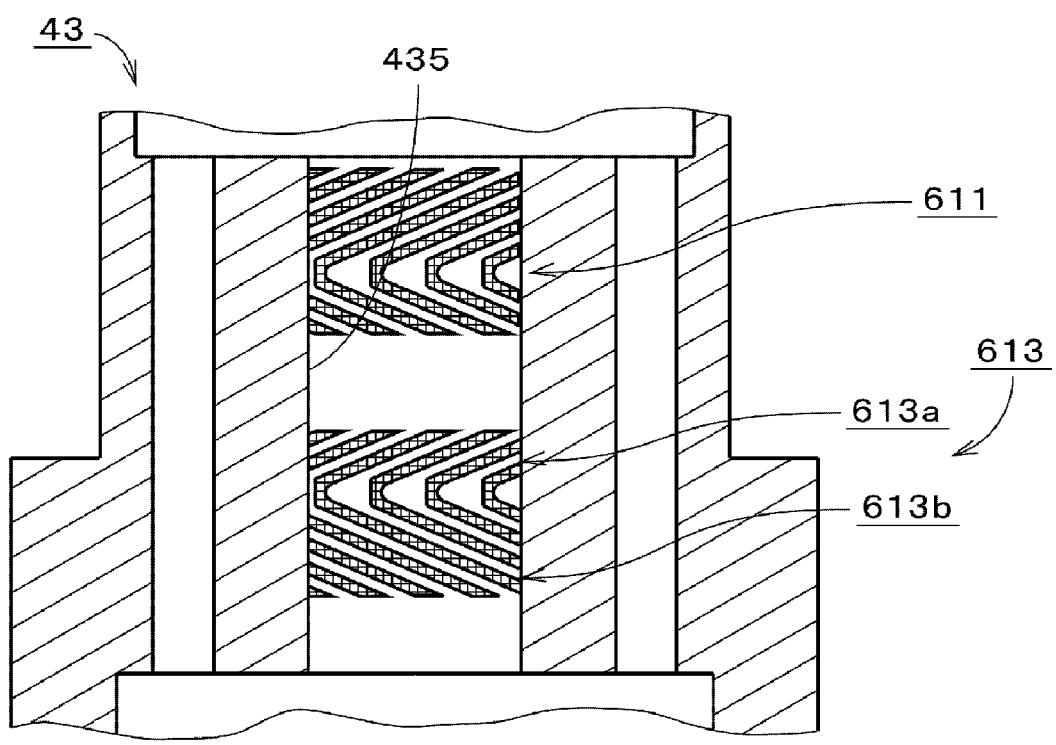
FIG. 15 is a section view of the sleeve portion according to the second preferred embodiment of the present invention.

FIG. 15 is a section view of the sleeve portion 43. A lower portion of an inner side surface 435 of the sleeve portion 43 includes second radial dynamic pressure grooves 613 defined therein. The second radial dynamic pressure grooves 613 are different in shape from the second radial dynamic pressure grooves 612 illustrated in FIG. 5. A groove upper portion 613a of each second radial dynamic pressure groove 613 is arranged to be shorter than a groove lower portion 613b of the second radial dynamic pressure groove 613. The second radial dynamic pressure grooves 613 are arranged in the herringbone pattern. First radial dynamic pressure grooves 611 are arranged to apply a downward pressure to the lubricant 46, while the second radial dynamic pressure grooves 613 are arranged to apply an upward pressure to the lubricant 46 while the motor 12 is driven. This allows the lubricant 46 to be placed under increased pressure in a middle portion of a radial gap 53 defined between the sleeve portion 43 and a shaft 41 illustrated in FIG. 12.

Also in the second preferred embodiment, a difference in pressure does not occur between upper and lower capillary seal portions 64 and 65, or only such a slight difference in pressure occurs between the upper and lower capillary seal portions 64 and 65 that the function of the bearing mechanism 4 as a bearing may not be impaired, because none of a radial bearing portion 61 and the first and second thrust bearing portions 62 and 63 exists within the communicating channel 5 arranged to connect the upper and lower gaps 57 and 58 with each other. Because the first and second thrust bearing portions 62 and 63 are arranged above and below the thrust plate 42, respectively, there is no need to arrange a thrust bearing portion between a thrust bushing 451 and the sleeve portion 43. This contributes to increased flexibility in designing other members of the bearing mechanism 4 than the thrust plate 42.

Figure 16:
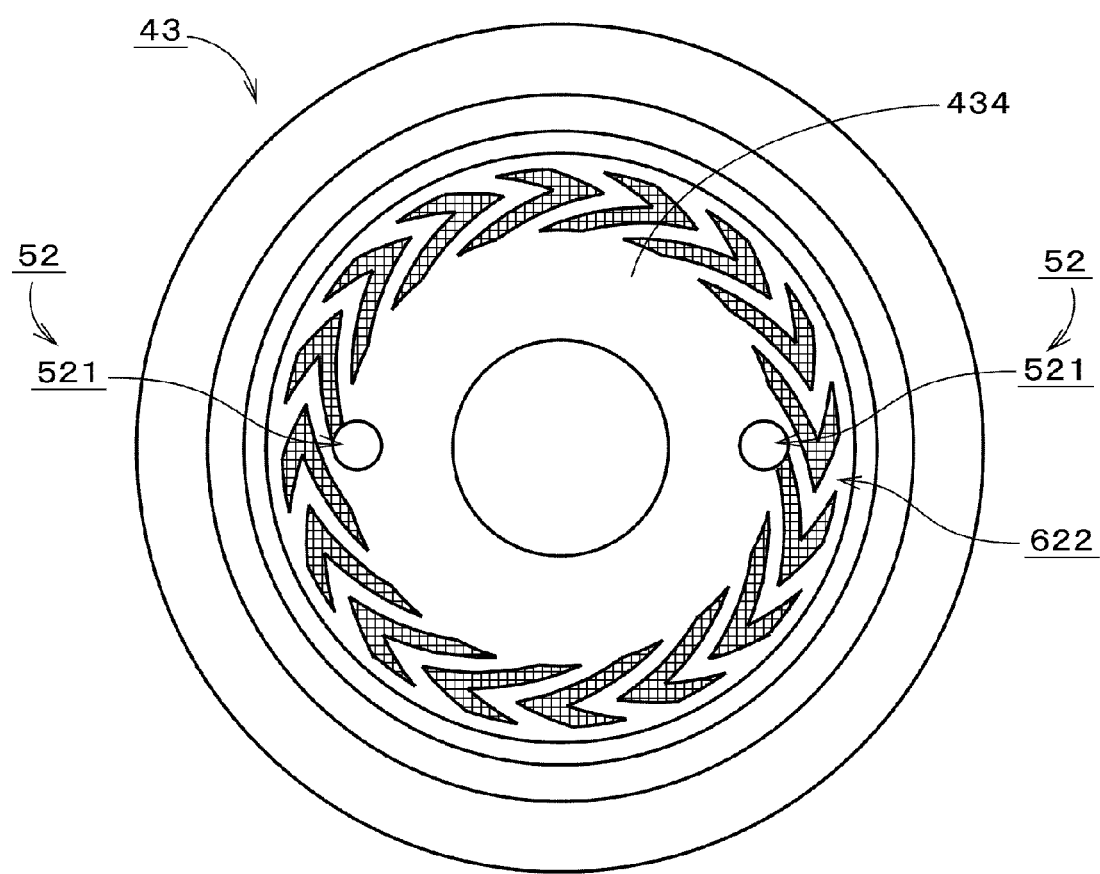
FIG. 16 is a bottom view of a sleeve portion according to an example modification of the second preferred embodiment of the present invention.

Referring to FIG. 16, a portion of the lower end opening 521 of each of the sleeve communicating holes 52 may be arranged in a region in which the first thrust dynamic pressure grooves 622 are arranged, as long as a difference in pressure does not occur between the upper and lower capillary seal portions 64 and 65, or as long as only such a slight difference in pressure occurs between the upper and lower capillary seal portions 64 and 65 that the function of the bearing mechanism 4 as a bearing may not be impaired. In this case, the remaining portion of the lower end opening 521 is arranged radially inward of the first thrust dynamic pressure grooves 622.

Similarly, a portion of the upper end opening 511 of each of the plate communicating holes 51 illustrated in FIG. 12 may be arranged to coincide, in the direction parallel of substantially parallel to the central axis J1, with the first thrust dynamic pressure grooves 622 illustrated in FIG. 16. In this case, the remaining portion of the upper end opening 511 is arranged radially inward of the first thrust dynamic pressure grooves 622. In addition, concerning the second thrust gap 55, a portion of the lower end opening 512 of each of the plate communicating holes 51 may be arranged to coincide, in the direction parallel or substantially parallel to the central axis J1, with the second thrust dynamic pressure grooves 632 illustrated in FIG. 14. In this case, the remaining portion of the lower end opening 512 is arranged radially inward of the second thrust dynamic pressure grooves 632. Note that any of the gap defining portions 45a to 45c as illustrated in FIGS. 9 to 11, respectively, may be used in the second preferred embodiment.

Figure 17:
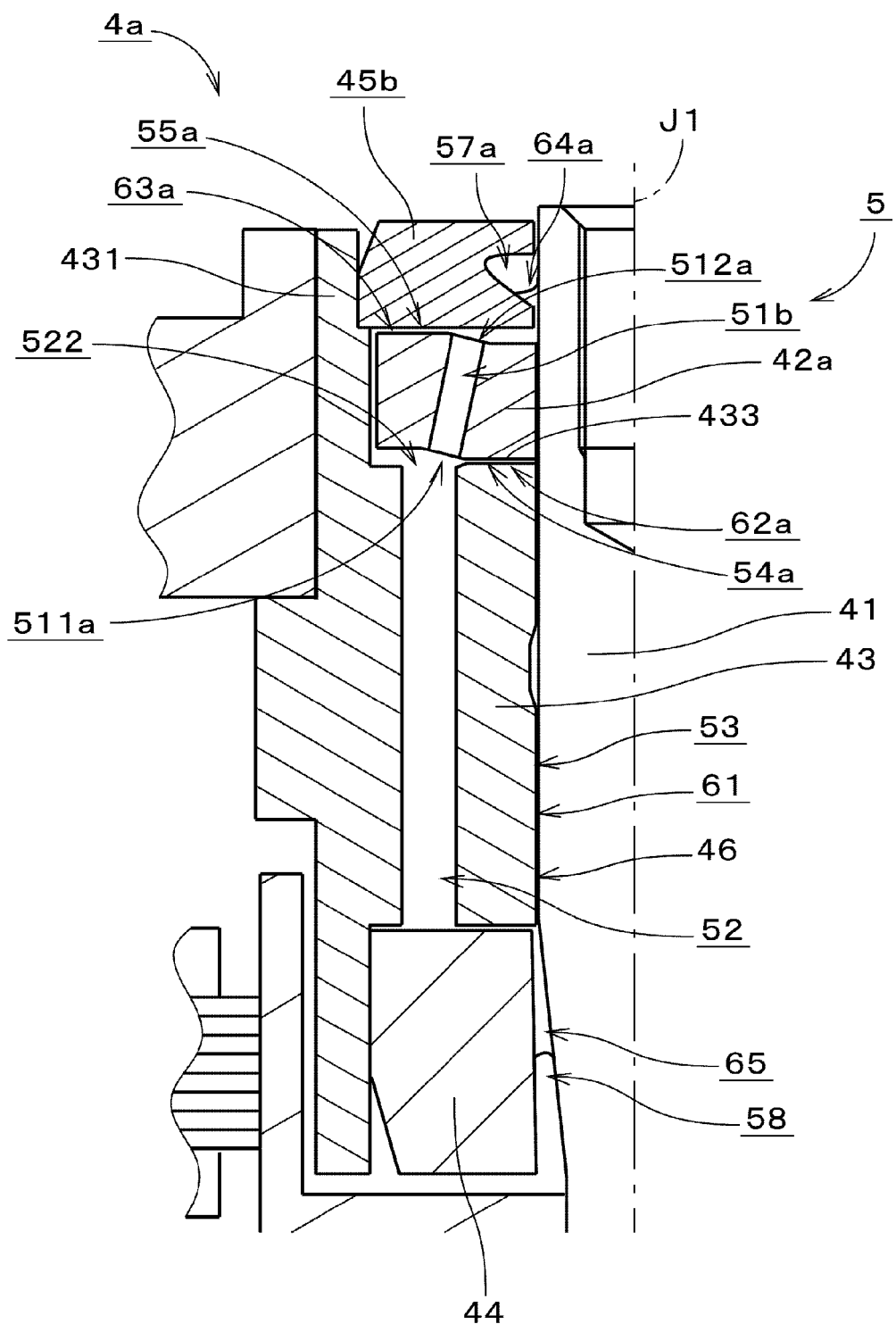
FIG. 17 is a section view of a bearing mechanism in a motor according to a third preferred embodiment of the present invention.

FIG. 17 is a diagram illustrating a bearing mechanism 4a in a motor according to a third preferred embodiment of the present invention. In the bearing mechanism 4a, a thrust plate 42a is arranged above an upper surface 433 of a sleeve portion 43. The thrust plate 42a is substantially identical in configuration to the thrust plate 42 illustrated in FIG. 4 except that it is turned upside down. The thrust plate 42a is fixed to a shaft 41. Lower end openings 511a defined in the thrust plate 42a correspond to the upper end openings 511 defined in the thrust plate 42 illustrated in FIG. 4. Upper end openings 512a defined in the thrust plate 42a correspond to the lower end openings 512 defined in the thrust plate 42. A gap defining portion 45b is arranged above the thrust plate 42a. The gap defining portion 45b has substantially the same configuration as that of the gap defining portion 45b illustrated in FIG. 10.

The gap defining portion 45b is a member which, as is the case with the upper seal member 452 illustrated in FIG. 3, preferably defines a portion of a rotating portion 3 and which is fixed to a first cylindrical portion 431 of the sleeve portion 43. Hereinafter, the gap defining portion 45b will be referred to as an "upper seal member 45b". An upper capillary seal portion 64a is defined in an upper gap 57a defined between the upper seal member 45b and the shaft 41. The third preferred embodiment is otherwise substantially similar in structure to the first preferred embodiment. Also in the bearing mechanism 4a, a communicating channel 5 is defined which extends from the upper gap 57a to a lower gap 58 through plate communicating holes 51b and sleeve communicating holes 52.

Figure 18:
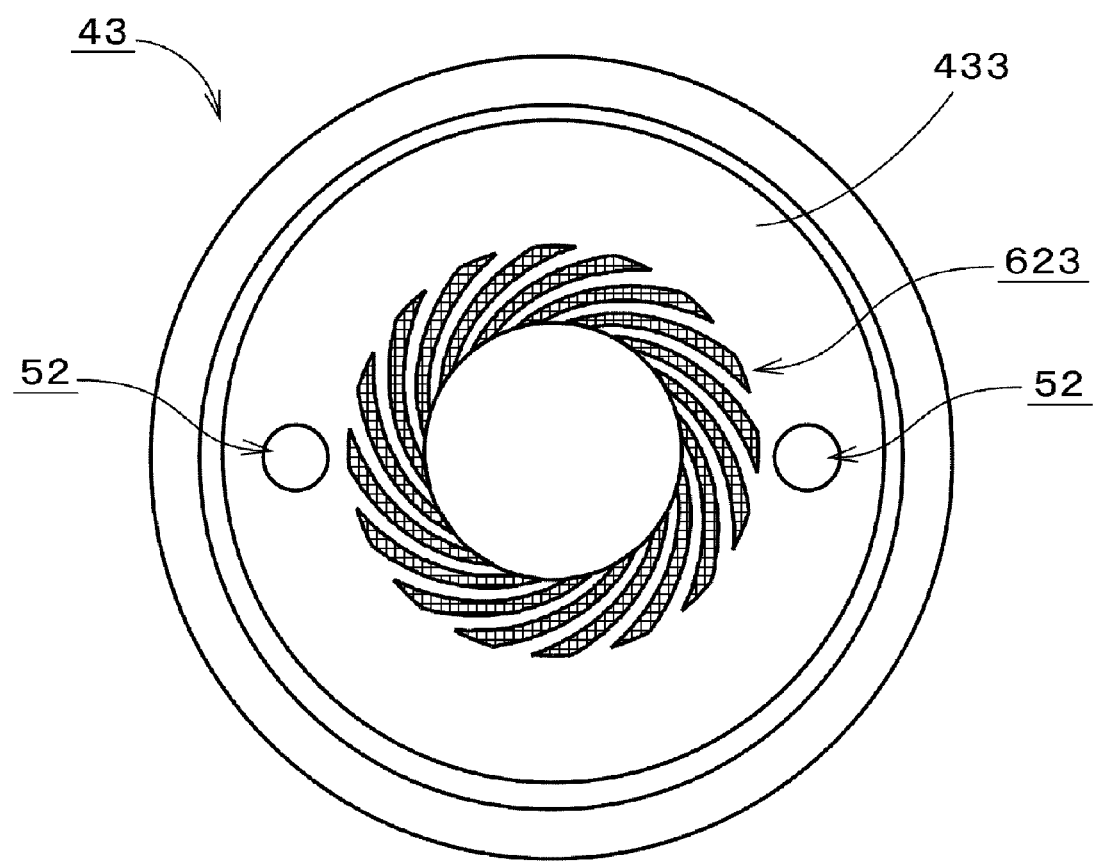
FIG. 18 is a plan view of a sleeve portion according to the third preferred embodiment of the present invention.
Figure 19:
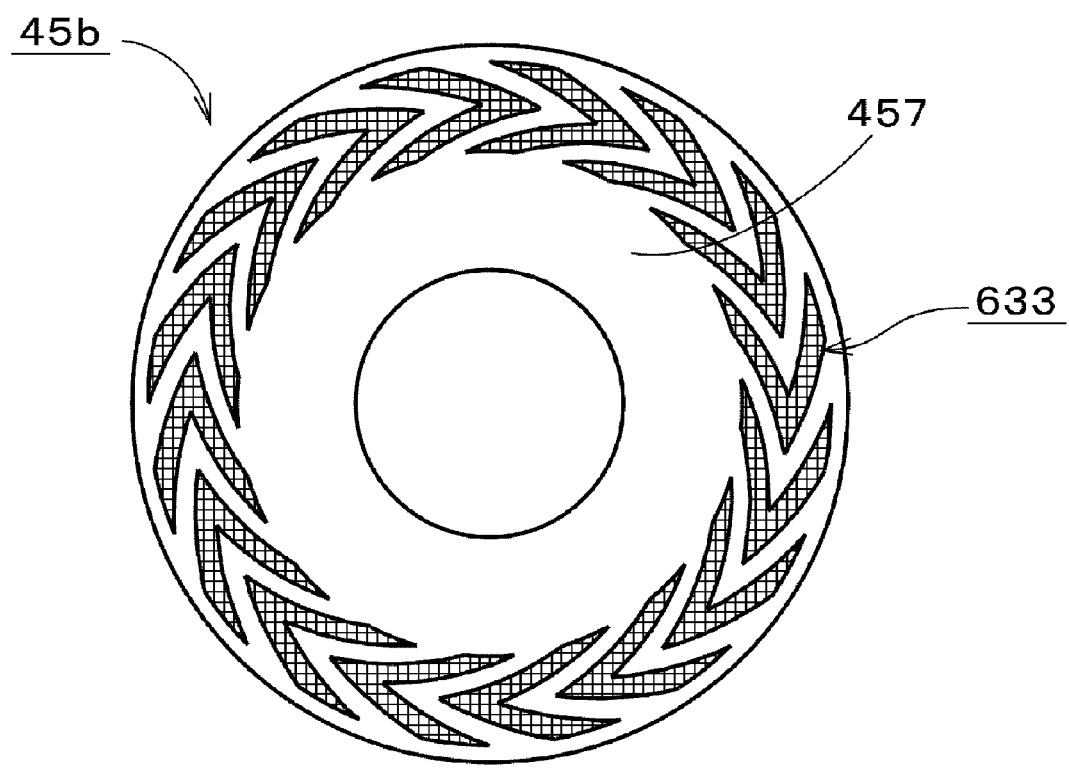
FIG. 19 is a bottom view of a gap defining portion according to the third preferred embodiment of the present invention.

Referring to FIG. 18, the upper surface 433 of the sleeve portion 43 includes first thrust dynamic pressure grooves 623 in a spiral pattern defined therein. The first thrust dynamic pressure grooves 623 are arranged radially inward of the sleeve communicating holes 52. A first thrust gap 54a defined between the thrust plate 42a and the sleeve portion 43 as illustrated in FIG. 17 includes a first thrust bearing portion 62a arranged radially inward of the plate communicating holes 51b and the sleeve communicating holes 52. Referring to FIG. 19, a lower surface 457 of the upper seal member 45b includes second thrust dynamic pressure grooves 633 in a balanced herringbone pattern arranged in the vicinity of an outer circumference thereof. A second thrust gap 55a defined between the thrust plate 42a and the upper seal member 45b as illustrated in FIG. 17 includes a second thrust bearing portion 63a arranged radially outward of the plate communicating holes 51b.

In the bearing mechanism 4a, a portion of the upper end opening 512a of each plate communicating hole 51b may be arranged to overlap with the second thrust bearing portion 63a, as long as a difference in pressure does not occur between the upper capillary seal portion 64a and a lower capillary seal portion 65, or as long as only such a slight difference in pressure occurs between the upper and lower capillary seal portions 64a and 65 that the function of the bearing mechanism 4a as a bearing may not be impaired. In this case, the remaining portion of the upper end opening 512a is arranged radially inward of the second thrust bearing portion 63a. Similarly, a portion of the lower end opening 511a of each plate communicating hole 51b, and a portion of an upper end opening 522 of each sleeve communicating hole 52, may be arranged to overlap with the first thrust bearing portion 62a. In this case, the remaining portion of the lower end opening 511a and the remaining portion of the upper end opening 522 are arranged radially outward of the first thrust bearing portion 62a.

Figure 20:
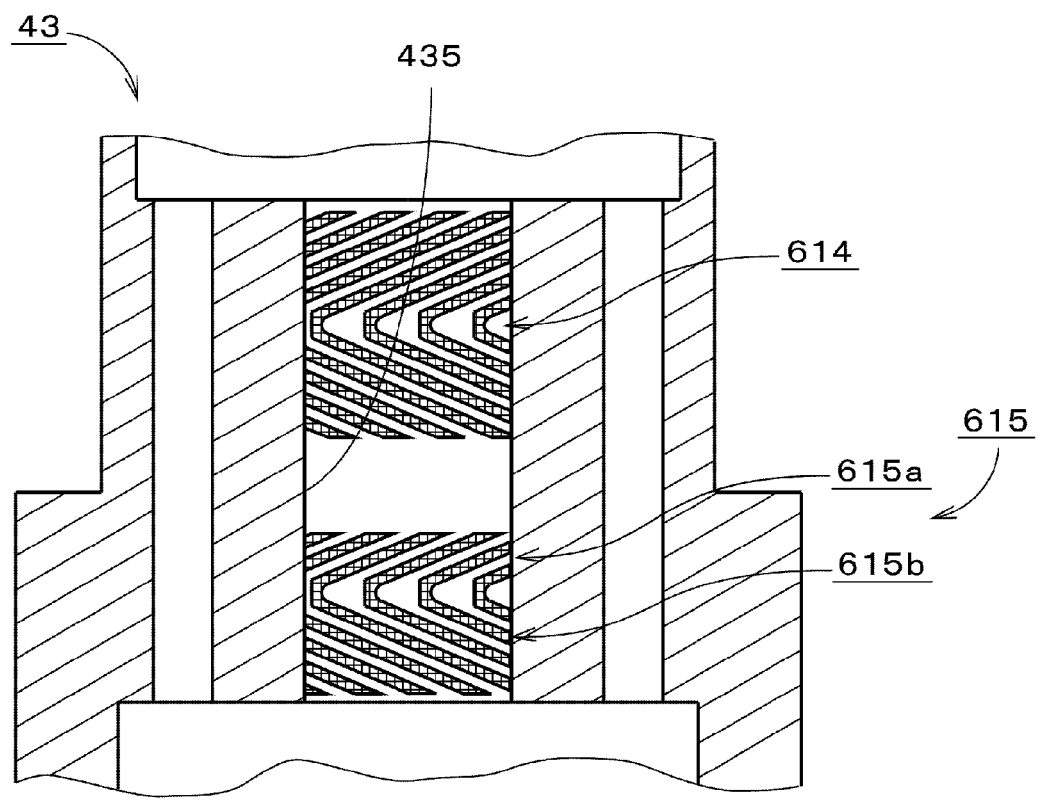
FIG. 20 is a section view of the sleeve portion according to the third preferred embodiment of the present invention.

Referring to FIG. 20, an upper portion of an inner side surface 435 of the sleeve portion 43 includes first radial dynamic pressure grooves 614 in the balanced herringbone pattern defined therein. Meanwhile, a lower portion of the inner side surface 435 includes second radial dynamic pressure grooves 615 defined therein. A groove upper portion 615a of each second radial dynamic pressure groove 615 is arranged to be shorter than a groove lower portion 615b of the second radial dynamic pressure groove 615. Referring to FIG. 17, a radial bearing portion 61 is defined in a radial gap 53 defined between the shaft 41 and the sleeve portion 43. The radial bearing portion 61 is arranged to increase a pressure acting on the lubricant 46 in the direction of the first thrust gap 54a through the second radial dynamic pressure grooves 615. Moreover, a radially inward pressure is applied to the lubricant 46 in the first thrust gap 54a through the first thrust bearing portion 62a, and the lubricant 46 is therefore placed under increased pressure at and near an intersection of the first thrust gap 54a and the radial gap 53.

Also in the third preferred embodiment, a difference in pressure does not occur between the upper and lower capillary seal portions 64a and 65, or only such a slight difference in pressure occurs between the upper and lower capillary seal portions 64a and 65 that the function of the bearing mechanism 4a as a bearing may not be impaired, because none of the radial bearing portion 61 and the first and second thrust bearing portions 62a and 63a exist within the communicating channel 5. The provision of the second thrust bearing portion 63a and the upper capillary seal portion 64a around the upper seal member 45b contributes to a reduction in the number of components of the bearing mechanism 4a. The same is true of a fourth preferred embodiment of the present invention described below.

Figure 21:
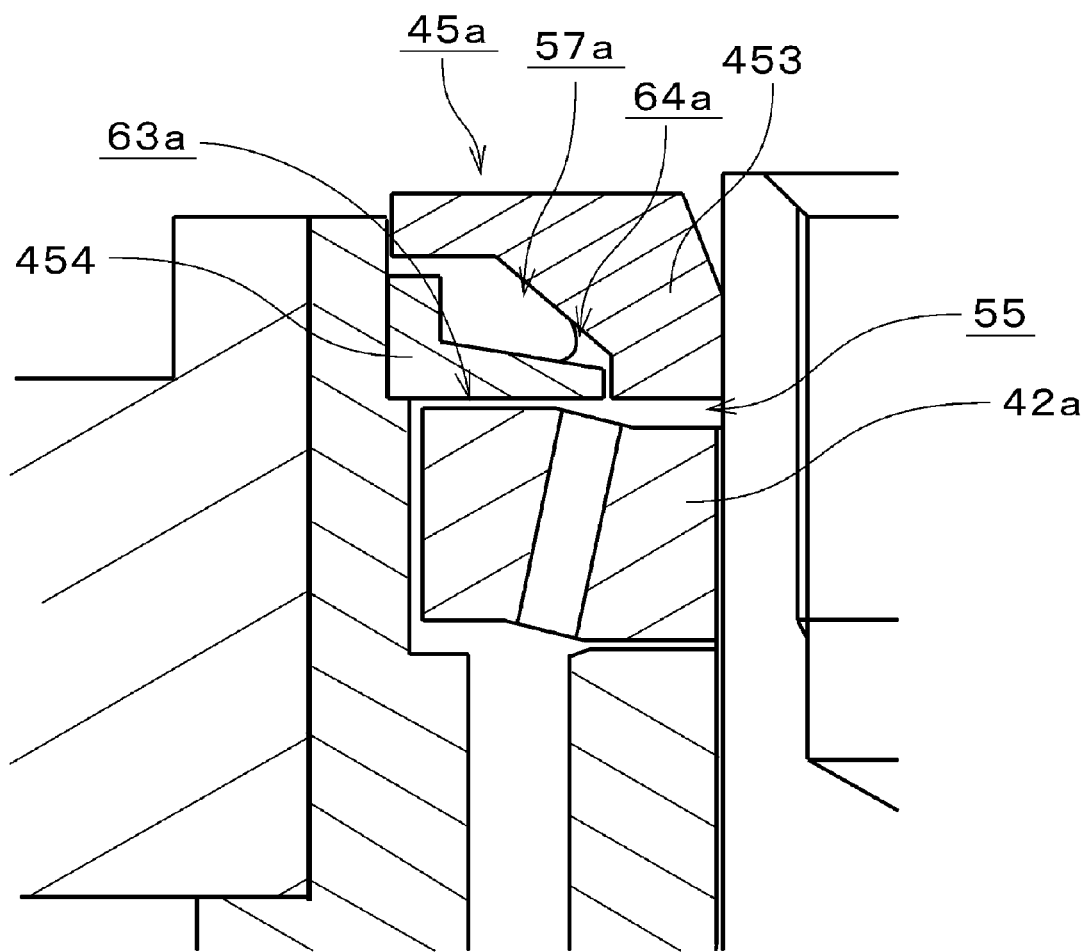
FIG. 21 is a diagram illustrating a gap defining portion according to an example modification of the third preferred embodiment of the present invention.

Referring to FIG. 21, the gap defining portion 45a illustrated in FIG. 9 may be used in the third preferred embodiment. In the case where the gap defining portion 45a is used, the second thrust bearing portion 63a is defined between the upper seal member 454 and the thrust plate 42 in the second thrust gap 55 defined between the gap defining portion 45a and the thrust plate 42a. The same is true of the fourth preferred embodiment described below.

Figure 22:
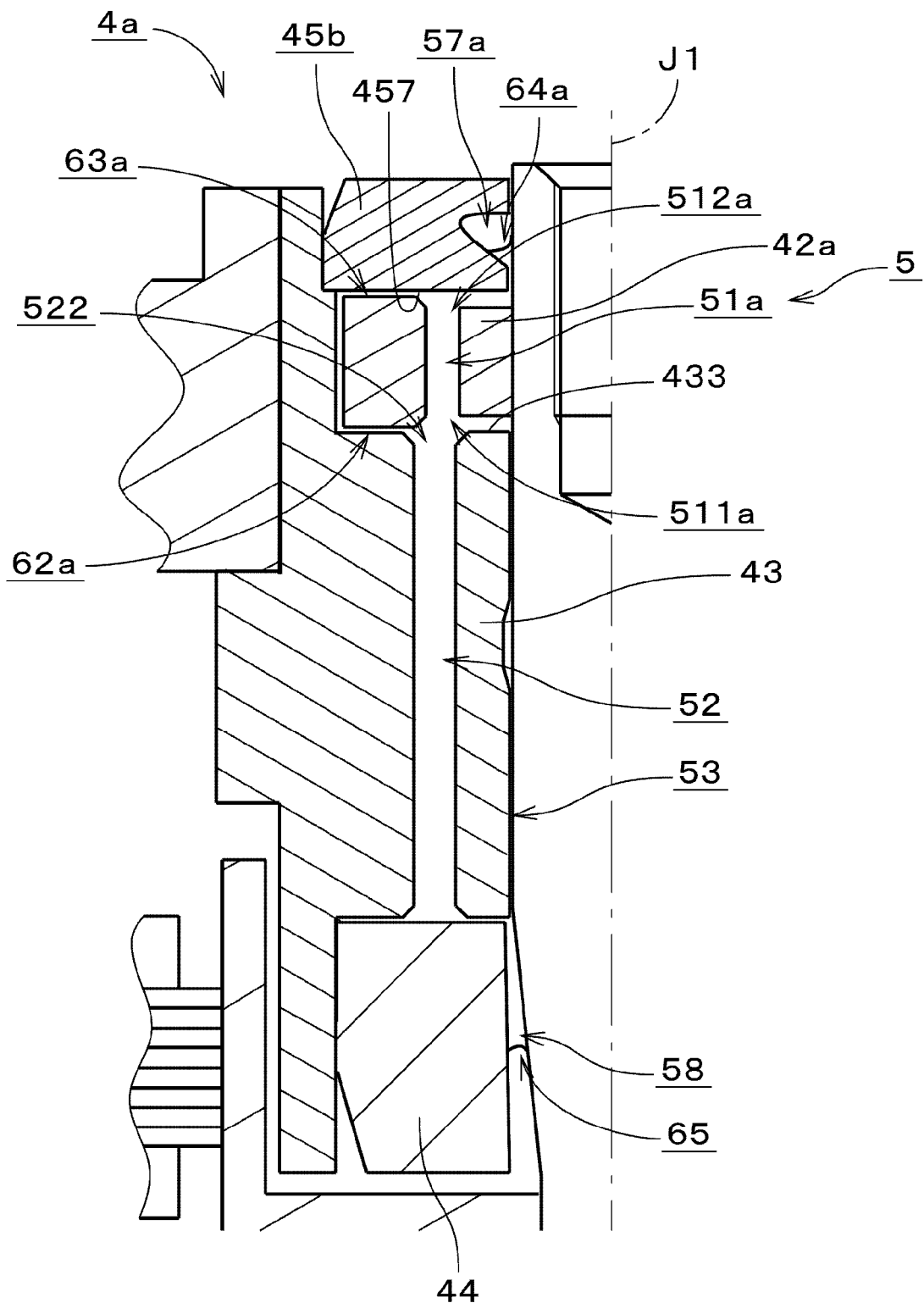
FIG. 22 is a section view of a bearing mechanism in a motor according to a fourth preferred embodiment of the present invention.

FIG. 22 is a diagram illustrating a bearing mechanism 4a in a motor according to the fourth preferred embodiment. In the bearing mechanism 4a, a thrust plate 42a similar to the thrust plate 42 used in the bearing mechanism 4 illustrated in FIG. 12 is arranged above an upper surface 433 of a sleeve portion 43. First thrust dynamic pressure grooves that are similar in configuration to the second thrust dynamic pressure grooves 632 illustrated in FIG. 14 are defined in the upper surface 433 of the sleeve portion 43. A first thrust bearing portion 62a is defined between the sleeve portion 43 and the thrust plate 42a, and is arranged radially outward of plate communicating holes 51a. A lower surface 457 of an upper seal member 45b includes the second thrust dynamic pressure grooves 633 illustrated in FIG. 19 defined therein. A second thrust bearing portion 63a is defined between the upper seal member 45b and the thrust plate 42a, and is arranged radially outward of the plate communicating holes 51a. First and second radial dynamic pressure grooves in the balanced herringbone pattern are arranged in an upper portion and a lower portion, respectively, of a radial gap 53. The bearing mechanism 4a according to the fourth preferred embodiment is otherwise similar in structure to the bearing mechanism 4a according to the third preferred embodiment.

In the fourth preferred embodiment, as well as in the other preferred embodiments described above, a difference in pressure does not occur between upper and lower capillary seal portions 64a and 65, or only such a slight difference in pressure occurs between the upper and lower capillary seal portions 64a and 65 that the function of the bearing mechanism 4a as a bearing may not be impaired, because of the provision of a communicating channel 5 including the plate communicating holes 51a and sleeve communicating holes 52. In the bearing mechanism 4a, a portion of an upper end opening 512a of each plate communicating hole 51a may be arranged to overlap with the second thrust bearing portion 63a, with the remaining portion of the upper end opening 512a arranged radially inward of the second thrust bearing portion 63a. In addition, a portion of a lower end opening 511a of each plate communicating hole 51a, and a portion of an upper end opening 522 of each sleeve communicating hole 52, may also be arranged to overlap with the first thrust bearing portion 62a, with the remaining portion of the lower end opening 511a and the remaining portion of the upper end opening 522 arranged radially inward of the first thrust bearing portion 62a.

In each of the first to fourth preferred embodiments described above, the thrust plate 42 (see FIGS. 4 and 12) or the thrust plate 42a (see FIGS. 17, 21, and 22) is arranged on one axial side of the sleeve portion 43. In addition, a first seal member is arranged on an opposite axial side of the thrust plate 42 or 42a with respect to the sleeve portion 43, while a first capillary seal portion is defined in a first gap defined between the first seal member and the shaft. Specifically, in each of FIGS. 4 and 12, the lower seal member 44 corresponds to the first seal member, the shaft 41 corresponds to the shaft, the lower gap 58 corresponds to the first gap, and the lower capillary seal portion 65 corresponds to the first capillary seal portion. In FIG. 17, the gap defining portion 45b corresponds to the first seal member, the shaft 41 corresponds to the shaft, the upper gap 57a corresponds to the first gap, and the upper capillary seal portion 64a corresponds to the first capillary seal portion. In FIG. 21, the upper seal member 454 corresponds to the first seal member, the bushing 453 corresponds to the shaft, the upper gap 57a corresponds to the first gap, and the upper capillary seal portion 64a corresponds to the first capillary seal portion. In FIG. 22, the upper seal member 45b corresponds to the first seal member, the shaft 41 corresponds to the shaft, the upper gap 57a corresponds to the first gap, and the upper capillary seal portion 64a corresponds to the first capillary seal portion.

In addition, on an opposite axial side of the sleeve portion 43, a second capillary seal portion is defined in a second gap defined between the rotating portion 3 and the shaft. Specifically, in each of FIGS. 3, 12 and 9, the upper seal member 452 or 454 corresponds to the rotating portion, the thrust bushing 451 or the bushing 453 corresponds to the shaft, the upper gap 57 corresponds to the second gap, and the upper capillary seal portion 64 corresponds to the second capillary seal portion. In FIG. 10, the gap defining portion 45b corresponds to the rotating portion, the shaft 41 corresponds to the shaft, the upper gap 57a corresponds to the second gap, and the upper capillary seal portion 64a corresponds to the second capillary seal portion. In FIG. 11, the first cylindrical portion 431 corresponds to the rotating portion, the gap defining portion 45c corresponds to the shaft, the upper gap 57a corresponds to the second gap, and the upper capillary seal portion 64a corresponds to the second capillary seal portion. In each of FIGS. 17 and 22, the lower seal member 44 corresponds to the rotating portion, the shaft 41 corresponds to the shaft, the lower gap 58 correspond to the second gap, and the lower capillary seal portion 65 corresponds to the second capillary seal portion.

While preferred embodiments of the present invention have been described above, the present invention is not limited to the preferred embodiments described above, but variations and modifications are possible.

For example, in each of the preferred embodiments described above, the thrust dynamic pressure grooves may preferably be defined in the thrust plate 42 or 42a. Also, dynamic pressure grooves of a variety of shapes may preferably be used in each of the radial bearing portion and the first and second thrust bearing portions, as long as a difference in pressure does not occur within the communicating channel 5, or as long as only such a slight difference in pressure occurs within the communicating channel 5 that the function of the bearing mechanism 4 or 4a as a bearing may not be impaired.

Further, in each of the preferred embodiments described above, a dynamic pressure generation portion may preferably be arranged to generate a fluid dynamic pressure in any of the upper gap 57 or 57a and the lower gap 58. This will more effectively prevent the lubricant 46 from leaking through any of the upper gap 57 or 57a and the lower gap 58, because the dynamic pressure generation portion will generate a pressure acting on the lubricant 46 in the direction of the interior of the communicating channel 5 while the motor 12 is driven.

Each of the thrust bushing 451, the bushing 453, and the thrust plate 42 or 42a may preferably be defined integrally with the shaft 41. The shaft 41 may preferably be defined integrally with the base bracket 21. Moreover, the sleeve portion 43 may be defined integrally with the rotor hub 31.

In the first preferred embodiment described above, a portion of the lower end opening 512 of each plate communicating hole 51 may be arranged in an inner side surface of the thrust plate 42. Similarly, in the third preferred embodiment, a portion of the upper end opening 512a of each plate communicating hole 51b may be arranged in an inner side surface of the thrust plate 42a. In each of the preferred embodiments described above, each sleeve communicating hole 52 may be arranged to incline. Also, three or more sleeve communicating holes 52 may be arranged at substantially regular intervals in the circumferential direction. The number of plate communicating holes 51, 51a, or 51b may also be more than two.

In the first preferred embodiment described above, in the first thrust gap 54, thrust bearing portions may be arranged both radially inward and radially outward of the lower end opening 521 of each sleeve communicating hole 52 and the upper end opening 511 of each plate communicating hole 51. The same is true of the other preferred embodiments described above. A base plate defined integrally with the first housing member 141 may be arranged as a base portion of the disk drive apparatus 1.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor for use in a disk drive apparatus, the spindle motor comprising:
   a stationary portion including a stator; and
   a rotating portion including a rotor magnet and arranged to be rotatably supported by the stationary portion; wherein
   the stationary portion includes:
      a base portion; and
      a shaft including a thrust plate and fixed to the base portion;
   the rotating portion includes:
      a sleeve portion including an axial end surface arranged opposite the thrust plate; and
      a first seal member arranged opposite the thrust plate on an opposite side of the thrust plate with respect to the sleeve portion;
   a radial gap defined between the shaft and the sleeve portion includes a radial bearing portion arranged to generate a fluid dynamic pressure defined therein;
   a first thrust gap defined between the thrust plate and the sleeve portion includes a first thrust bearing portion arranged to generate a fluid dynamic pressure defined therein;
   a second thrust gap defined between the thrust plate and the first seal member includes a second thrust bearing portion arranged to generate a fluid dynamic pressure defined therein;
   a first gap defined between the first seal member and the shaft includes a first capillary seal portion defined therein;
   a second gap defined between the shaft and the rotating portion on an opposite axial side of the sleeve portion with respect to the thrust plate includes a second capillary seal portion defined therein;
   the thrust plate includes a plate communicating hole arranged to connect the first and second thrust gaps with each other;
   the sleeve portion includes a sleeve communicating hole arranged to connect the first thrust gap with the opposite axial side of the sleeve portion with respect to the thrust plate;
   an end opening of the plate communicating hole and an end opening of the sleeve communicating hole are arranged either radially outward or radially inward of the first thrust bearing portion in the first thrust gap, while an opposite end opening of the plate communicating hole is arranged radially inward of the second thrust bearing portion in the second thrust gap;
   a lubricant is continuously arranged in a channel extending from the first capillary seal portion to the second capillary seal portion through the second thrust gap, a gap defined radially outside the thrust plate, the first thrust gap, and the radial gap; and
   the lubricant is arranged to fill a communicating channel extending from the first capillary seal portion to the second capillary seal portion through the plate communicating hole and the sleeve communicating hole.

2. The spindle motor according to claim 1, wherein the plate communicating hole is arranged to connect a region radially inward of the second thrust bearing portion in the second thrust gap with a region radially outward of the first thrust bearing portion in the first thrust gap.

3. The spindle motor according to claim 2, wherein the plate communicating hole is arranged to extend obliquely.

4. The spindle motor according to claim 2, wherein
   the first thrust bearing portion includes dynamic pressure grooves arranged in a spiral pattern to apply a pressure to the lubricant which acts in a direction in which the shaft extends; and
   the radial bearing portion is arranged to apply a pressure to the lubricant which acts in a direction in which the thrust plate extends.

5. The spindle motor according to claim 1, wherein the second gap is arranged to extend radially inward as the second gap extends farther away from an opposite axial end surface of the sleeve portion.

6. The spindle motor according to claim 1, wherein each of the first gap and the second gap is arranged to gradually increase in width as the first or second gap approaches an open end thereof.

7. The spindle motor according to claim 6, wherein one of the first gap and the second gap which is arranged closer to the base portion is arranged to define a smaller angle than an angle defined by another one of the first gap and the second gap, and the one of the first gap and the second gap is arranged to hold a portion of the lubricant of a greater length than that of a portion of the lubricant held by the another one of the first gap and the second gap.

8. A disk drive apparatus comprising:
   the spindle motor of claim 1 arranged to rotate a disk;
   an access portion arranged to read and/or write information from or to the disk; and
   a housing arranged to contain the disk, the spindle motor, and the access portion; wherein
   the base portion is arranged to define a portion of the housing.

* * * * *